United States Patent
Arling et al.

(10) Patent No.: US 11,651,677 B2
(45) Date of Patent: *May 16, 2023

(54) SYSTEM AND METHOD FOR OPTIMIZED APPLIANCE CONTROL

(71) Applicant: Universal Electronics Inc., Scottsdale, AZ (US)

(72) Inventors: Paul D. Arling, Scottsdale, AZ (US); Brian Barnett, Oakland, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,237

(22) Filed: Aug. 30, 2021

(65) Prior Publication Data

US 2021/0390846 A1    Dec. 16, 2021

Related U.S. Application Data

(63) Continuation of application No. 16/778,241, filed on Jan. 31, 2020, now Pat. No. 11,113,954, which is a
(Continued)

(51) Int. Cl.
*G08C 17/02* (2006.01)
*H04N 21/422* (2011.01)
(Continued)

(52) U.S. Cl.
CPC ............ *G08C 17/02* (2013.01); *G08C 23/04* (2013.01); *H04N 21/42226* (2013.01);
(Continued)

(58) Field of Classification Search
CPC .... G08C 17/02; G08C 23/04; G08C 2201/20; G08C 2201/30; G08C 2201/40;
(Continued)

(56) References Cited

U.S. PATENT DOCUMENTS

| 5,959,539 A | 9/1999 | Adolph et al. |
| 6,160,491 A | 12/2000 | Kitao et al. |

(Continued)

FOREIGN PATENT DOCUMENTS

| CN | 102541547 A | 7/2012 |
| CN | 102882751 A | 1/2013 |

(Continued)

OTHER PUBLICATIONS

USPTO, Non-Final Office Action issued on U.S. Appl. No. 17/529,341, dated Feb. 17, 2022, 11 pgs.
(Continued)

*Primary Examiner* — Adnan Aziz
(74) *Attorney, Agent, or Firm* — Greenberg Traurig, LLP

(57) ABSTRACT

In response to a detected presence of an intended target appliance within a logical topography of controllable appliances identity information associated with the intended target appliance is used to automatically add to a graphical user interface of a controlling device an icon representative of the intended target appliance and to create at a Universal Control Engine a listing of communication methods for use in controlling corresponding functional operations of the intended target appliance. When the icon is later activated, the controlling device is placed into an operating state appropriate for controlling functional operations of the intended target appliance while the Universal Control Engine uses at least one of the communication methods to transmit at least one command to place the intended target appliance into a predetermined operating state.

14 Claims, 14 Drawing Sheets

Related U.S. Application Data continuation of application No. 16/199,463, filed on Nov. 26, 2018, now Pat. No. 10,937,306, which is a continuation of application No. 15/900,342, filed on Feb. 20, 2018, now Pat. No. 10,922,958, which is a continuation of application No. 15/789,547, filed on Oct. 20, 2017, now Pat. No. 10,325,486, which is a continuation of application No. 15/259,847, filed on Sep. 8, 2016, now Pat. No. 9,842,492, which is a continuation of application No. 14/136,023, filed on Dec. 20, 2013, now Pat. No. 9,449,500, which is a continuation-in-part of application No. 13/899,671, filed on May 22, 2013, now Pat. No. 9,437,105, which is a continuation of application No. 13/657,176, filed on Oct. 22, 2012, now Pat. No. 9,215,394.

(60) Provisional application No. 61/552,857, filed on Oct. 28, 2011, provisional application No. 61/680,876, filed on Aug. 8, 2012.

(51) Int. Cl.
  *G08C 23/04* (2006.01)
  *H04N 21/4363* (2011.01)

(52) U.S. Cl.
  CPC ..... *G08C 2201/20* (2013.01); *G08C 2201/30* (2013.01); *G08C 2201/40* (2013.01); *G08C 2201/70* (2013.01); *G08C 2201/92* (2013.01); *G08C 2201/93* (2013.01); *H04N 21/42225* (2013.01); *H04N 21/4363* (2013.01)

(58) Field of Classification Search
  CPC ............ G08C 2201/70; G08C 2201/92; G08C 2201/93; H04N 21/42225; H04N 21/4363; H04N 21/43615; H04N 21/43635; H04N 21/43637; H04N 21/44227
  See application file for complete search history.

(56) References Cited

U.S. PATENT DOCUMENTS

| | | |
|---|---|---|
| 6,259,892 B1 | 7/2001 | Helferich |
| 6,529,556 B1 | 3/2003 | Perdue et al. |
| 6,850,252 B1 | 2/2005 | Hoffberg |
| 6,968,399 B2 | 11/2005 | Noda et al. |
| 7,136,709 B2 | 11/2006 | Arling et al. |
| 7,379,778 B2 | 5/2008 | Hayes et al. |
| 7,436,346 B2 | 10/2008 | Walter et al. |
| 7,499,462 B2 | 3/2009 | MacMullan et al. |
| 7,519,393 B2 | 4/2009 | Bahl et al. |
| 7,589,642 B1 | 9/2009 | Mui |
| 7,944,370 B1 | 5/2011 | Harris et al. |
| 7,969,514 B2 | 6/2011 | Haughawout et al. |
| 8,040,888 B1 | 10/2011 | MacAdam et al. |
| 8,199,258 B2 | 6/2012 | Tokoro |
| 8,260,975 B1 | 9/2012 | Schanin et al. |
| 8,269,892 B2 | 9/2012 | Asada |
| 8,373,556 B2 | 2/2013 | LaLonde et al. |
| 8,429,713 B2 | 4/2013 | Candelore et al. |
| 8,477,179 B2 | 7/2013 | Tatsuta et al. |
| 8,633,986 B1 | 1/2014 | Hughes |
| 8,810,732 B1 | 8/2014 | Bozarth |
| 8,839,334 B2 | 9/2014 | Lee |
| 8,881,205 B2 | 11/2014 | Friedman |
| 9,019,435 B2 | 4/2015 | Barnett et al. |
| 9,239,837 B2 * | 1/2016 | Chardon .......... H04N 21/42209 |
| 9,350,850 B2 | 5/2016 | Pope |
| 9,792,133 B2 | 10/2017 | Lee et al. |
| 10,593,196 B2 | 3/2020 | Arling |
| 2001/0005197 A1 | 6/2001 | Mishra et al. |
| 2002/0174270 A1 | 11/2002 | Stecyk et al. |
| 2002/0194299 A1 | 12/2002 | Yasaki et al. |
| 2002/0194596 A1 | 12/2002 | Srivastava |
| 2003/0095156 A1 | 5/2003 | Klein et al. |
| 2004/0143847 A1 | 7/2004 | Suzuki et al. |
| 2004/0148632 A1 | 7/2004 | Park et al. |
| 2004/0163073 A1 | 8/2004 | Krzyzanowski et al. |
| 2004/0210933 A1 | 10/2004 | Dresti et al. |
| 2004/0228605 A1 | 11/2004 | Quan et al. |
| 2004/0255329 A1 | 12/2004 | Compton et al. |
| 2005/0028208 A1 | 2/2005 | Ellis |
| 2005/0151726 A1 | 7/2005 | Wouters |
| 2005/0195823 A1 | 9/2005 | Chen et al. |
| 2005/0220194 A1 | 10/2005 | Compton et al. |
| 2006/0080408 A1 | 4/2006 | Istvan et al. |
| 2006/0080707 A1 | 4/2006 | Laksono |
| 2006/0095401 A1 | 5/2006 | Krikorian et al. |
| 2006/0146184 A1 | 7/2006 | Gillard et al. |
| 2006/0168618 A1 | 7/2006 | Choi |
| 2006/0197753 A1 | 9/2006 | Hotelling |
| 2006/0209745 A1 | 9/2006 | MacMullan et al. |
| 2006/0227032 A1 | 10/2006 | Vidal |
| 2006/0245725 A1 | 11/2006 | Lim |
| 2006/0271997 A1 | 11/2006 | Jacoby et al. |
| 2007/0052547 A1 | 3/2007 | Haughawout et al. |
| 2007/0165555 A1 | 7/2007 | Deng |
| 2007/0220150 A1 | 9/2007 | Garg |
| 2007/0225828 A1 | 9/2007 | Huang |
| 2007/0229465 A1 | 10/2007 | Sakai |
| 2007/0268360 A1 | 11/2007 | Ahlgren |
| 2007/0288610 A1 | 12/2007 | Saint Clair et al. |
| 2007/0288932 A1 | 12/2007 | Horvitz et al. |
| 2007/0292135 A1 | 12/2007 | Guo et al. |
| 2008/0005764 A1 | 1/2008 | Arling et al. |
| 2008/0007616 A1 | 1/2008 | Baladhandayuthapani |
| 2008/0120673 A1 | 5/2008 | Dong et al. |
| 2008/0141316 A1 | 6/2008 | Igoe et al. |
| 2008/0168519 A1 | 7/2008 | Rao et al. |
| 2008/0187028 A1 | 8/2008 | Lida |
| 2008/0231762 A1 | 9/2008 | Hardacker et al. |
| 2008/0244097 A1 * | 10/2008 | Candelore .......... H04N 21/4432 710/5 |
| 2008/0247544 A1 | 10/2008 | Candelore et al. |
| 2008/0278567 A1 | 11/2008 | Nakajima |
| 2009/0015723 A1 | 1/2009 | Doumuki |
| 2009/0031419 A1 | 1/2009 | Laksono |
| 2009/0040091 A1 | 2/2009 | Carlson et al. |
| 2009/0051824 A1 | 2/2009 | Satou |
| 2009/0156051 A1 | 6/2009 | Doyle |
| 2009/0167555 A1 | 7/2009 | Kohanek |
| 2009/0195407 A1 | 8/2009 | Nakano et al. |
| 2009/0207039 A1 | 8/2009 | Haijima |
| 2009/0239587 A1 | 9/2009 | Negron et al. |
| 2009/0248909 A1 | 10/2009 | Hironaka et al. |
| 2009/0254500 A1 | 10/2009 | Stecyk |
| 2009/0284656 A1 | 11/2009 | Suzuki et al. |
| 2010/0079682 A1 | 4/2010 | Martch |
| 2010/0118193 A1 | 5/2010 | Boyden et al. |
| 2010/0131682 A1 | 5/2010 | Huang et al. |
| 2010/0134317 A1 | 6/2010 | Breuil et al. |
| 2010/0138764 A1 | 6/2010 | Hatambeiki et al. |
| 2010/0157169 A1 | 6/2010 | Yoshida et al. |
| 2010/0177245 A1 | 7/2010 | Ohnuma et al. |
| 2010/0194983 A1 | 8/2010 | Iguchi |
| 2010/0271560 A1 | 10/2010 | Higuchi et al. |
| 2010/0315279 A1 | 12/2010 | Hamai et al. |
| 2010/0328547 A1 | 12/2010 | Mayorga |
| 2011/0102230 A1 | 5/2011 | Vergis et al. |
| 2011/0142059 A1 | 6/2011 | Bedingfield, Sr. et al. |
| 2011/0156944 A1 | 6/2011 | Ward et al. |
| 2011/0181386 A1 | 7/2011 | Lee et al. |
| 2011/0187928 A1 | 8/2011 | Crabtree |
| 2011/0273287 A1 | 11/2011 | LaLonde et al. |
| 2011/0274008 A1 | 11/2011 | Lida |
| 2011/0283129 A1 | 11/2011 | Guillerm |
| 2011/0285818 A1 | 11/2011 | Park |
| 2011/0289113 A1 | 11/2011 | Arling et al. |
| 2011/0314153 A1 | 12/2011 | Bathiche et al. |
| 2012/0013449 A1 | 1/2012 | Penisoara et al. |
| 2012/0013807 A1 | 1/2012 | Arora |

(56) References Cited

U.S. PATENT DOCUMENTS

| | | | |
|---|---|---|---|
| 2012/0021684 | A1 | 1/2012 | Schultz et al. |
| 2012/0069246 | A1 | 3/2012 | Thornberry et al. |
| 2012/0069894 | A1 | 3/2012 | Sakimura et al. |
| 2012/0082461 | A1 | 4/2012 | Meyer et al. |
| 2012/0084452 | A1 | 4/2012 | Pettit et al. |
| 2012/0136612 | A1 | 5/2012 | Vanderhoff et al. |
| 2012/0146918 | A1 | 6/2012 | Kreiner et al. |
| 2012/0171958 | A1 | 7/2012 | Cornett et al. |
| 2012/0173003 | A1 | 7/2012 | Kim |
| 2012/0185580 | A1 | 7/2012 | Detert |
| 2012/0196536 | A1 | 8/2012 | Koo et al. |
| 2012/0210268 | A1 | 8/2012 | Hilbrink et al. |
| 2012/0236161 | A1 | 9/2012 | Kwon et al. |
| 2012/0242526 | A1 | 9/2012 | Perez et al. |
| 2012/0249890 | A1 | 10/2012 | Chardon et al. |
| 2012/0274547 | A1 | 11/2012 | Raeber et al. |
| 2012/0274857 | A1 | 11/2012 | Maxwell et al. |
| 2012/0274863 | A1 | 11/2012 | Chardon et al. |
| 2012/0278693 | A1 | 11/2012 | Black et al. |
| 2012/0291128 | A1 | 11/2012 | Jayawardena et al. |
| 2012/0297040 | A1 | 11/2012 | Amano |
| 2012/0330943 | A1 | 12/2012 | Weber et al. |
| 2013/0005250 | A1 | 1/2013 | Kim et al. |
| 2013/0057774 | A1 | 3/2013 | Yoshida et al. |
| 2013/0058522 | A1 | 3/2013 | Raesig et al. |
| 2013/0069769 | A1 | 3/2013 | Pennington et al. |
| 2013/0107131 | A1 | 5/2013 | Barnett et al. |
| 2013/0142181 | A1 | 6/2013 | Makim et al. |
| 2013/0249679 | A1 | 9/2013 | Arling |
| 2013/0258918 | A1 | 10/2013 | Rudland |
| 2014/0085059 | A1 | 3/2014 | Chen et al. |
| 2014/0222861 | A1 | 8/2014 | Arling et al. |
| 2014/0235526 | A1 | 8/2014 | Slupik |
| 2017/0289484 | A1 | 10/2017 | Arling et al. |
| 2018/0152750 | A1 | 5/2018 | McMahon et al. |
| 2019/0379887 | A1 | 12/2019 | Marino et al. |

FOREIGN PATENT DOCUMENTS

| | | | |
|---|---|---|---|
| EP | 1722341 | A1 | 11/2006 |
| EP | 3084744 | A1 | 10/2016 |
| WO | 2011/053008 | A2 | 5/2011 |

OTHER PUBLICATIONS

USPTO, Non-Final Office Action issued on U.S. Appl. No. 17/528,297, dated Mar. 3, 2022, 12 pgs.
USPTO, Non-Final Office Action issued on U.S. Appl. No. 17/375,566, dated Jan. 21, 2022, 19 pgs.
USPTO, Office Action issued on U.S. Appl. No. 17/527,390, dated Feb. 3, 2022, 6 pgs.
USPTO, Non-Final Office Action issued on U.S. Appl. No. 17/527,532, dated Feb. 10, 2022, 10 pgs.
Brazilian Patent Office, office action issued on Brazilian patent application No. BR112014010028-4, dated Dec. 7, 2021, 4 pages.
ISA/US, Int. Search Report and Written Opinion of the Int. Searching Authority issued on Int. Appln. No. PCT/US12/62161, dated Jan. 23, 2013, 12 pages.
ISA/US, Int. Search Report and Written Opinion of the Int. Searching Authority issued on Int. Appln. No. PCT/US14/38151, dated Jun. 27, 2014, 10 pages.
European Patent Office, extended European Search Report issued on European patent application No. 12844121.9, dated Mar. 5, 2015, 6 pages.
European Patent Office, extended European Search Report issued on European patent application No. 14801064.8, dated Apr. 18, 2016, 8 pages.
European Patent Office, extended European Search Report issued on European patent application No. 14872863.7, dated Nov. 25, 2016, 8 pages.
USPTO, Final Office Action issued on U.S. Appl. No. 15/900,232, dated Dec. 13, 2018, 15 pgs.
USPTO, Non-Final Office Action issued on U.S. Appl. No. 16/196,756, dated Sep. 6, 2019, 9 pgs.
USPTO, Non-Final Office Action issued on U.S. Appl. No. 16/197,552, dated Sep. 6, 2019, 9 pgs.
USPTO, Non-Final Office Action issued on U.S. Appl. No. 16/197,552, dated Sep. 19, 2019, 10 pgs.
China National Intellectual Property Administration, Second Office Action issued in CN App. No. 201480057944.0, dated Jul. 16, 2019, 21 pgs.
High-Definition Multimedia Interface, HDMI Licensing, LLC, Specification Version 1.3a, Nov. 10, 2006, pp. 1-276.
USPTO, Final Office Action issued on U.S. Appl. No. 15/900,342, dated Nov. 29, 2018, 19 pgs.
EPO, examination report issued on European patent application No. 14801064.8, dated Jul. 11, 2019, 4 pages.
CNIPA, 2nd Office Action issued on Chinese patent application No. 201480057944.0, dated Jul. 16, 2019, 13 pages.
USPTO, Non-Final Office Action issued on U.S. Appl. No. 16/156,766, dated Oct. 4, 2019, 10 pgs.
ISA/US, International Search Report and Written Opinion issued on PCT application No. US19/54315, dated Jan. 2, 2020, 16 pages.
USPTO, Non-Final Office Action issued on U.S. Appl. No. 16/838,736, dated Mar. 18, 2021, 15 pgs.
USPTO, Non-Final Office Action issued on U.S. Appl. No. 16/814,493, dated Feb. 19, 2021, 15 pgs.
USPTO, Non-Final Office Action issued on U.S. Appl. No. 16/783,971, dated Sep. 2, 2020, 8 pgs.
Brazilian Patent Office, Office Action issued on Brazilian patent application No. BR1120150288588, dated Apr. 27, 2020, 2 pages.
USPTO, Final Office Action issued on U.S. Appl. No. 16/778,638, dated of Jul. 23, 2020, 6 pgs.
USPTO, Final Office Action issued on U.S. Appl. No. 16/199,463, dated May 6, 2020, 14 pgs.
USPTO, Non-Final Office Action issued on U.S. Appl. No. 16/457,309, dated Feb. 24, 2020, 11 pgs.
USPTO, Non-Final Office Action issued on U.S. Appl. No. 16/457,309, dated Mar. 6, 2020, 17 pgs.
USPTO, Non-Final Office Action issued on U.S. Appl. No. 16/778,638, dated Mar. 6, 2020, 8 pgs.
USPTO, Non-Final Office Action issued on U.S. Appl. No. 16/114,762, dated Feb. 14, 2020, 13 pgs.
Brazilian Patent Office, Office Action issued on Brazilian patent application No. BR1120140100284, dated Dec. 5, 2019, 2 pages.
USPTO, Non-Final Office Action issued on U.S. Appl. No. 15/899,971, dated Apr. 19, 2018, 11 pgs.
USPTO, Non-Final Office Action issued on U.S. Appl. No. 16/119,463, dated Nov. 22, 2019, 14 pgs.
USPTO, Non-Final Office Action issued on U.S. Appl. No. 15/900,342, dated Nov. 3, 2017, 10 pgs.
USPTO, Non-Final Office Action issued on U.S. Appl. No. 15/900,342, dated May 9, 2018, 14 pgs.
USPTO, Non-Final Office Action issued on U.S. Appl. No. 15/789,547, dated Jan. 25, 2018, 15 pgs.
USPTO, Final Office Action issued on U.S. Appl. No. 15/900,232, dated May 17, 2018, 14 pgs.
USPTO, Non-Final Office Action issued on U.S. Appl. No. 15/900,089, dated May 10, 2018, 13 pgs.
Declaration of Samuel H. Russ, PhD.
User Manual Harmony 900—Remote Control User Guide, Version 1.0, Logitech.
2010 Spring BD-Players, BDP IP & RS-232 Control Version 1. 00. 00, ("Remote Code Commands List") (http://files.remotecentral.com/library/22-1/pioneer/blue-ray_disc_player/index.html).
Transcript of the Sep. 30, 2020 Deposition of Dr. Turnbull.
2010 Spring BD-Players, BDP IP & RS-232 Control Version 1. 00. 00, Edited Dec. 8, 2010 ("Remote Code Commands List") https://www.pioneerelectronics.com/StaticFiles/PUSA/Files/Home%20Custom%20Install/2010%20Pioneer%20BDP_330_IP_&_RS-232_Commands.pdf).
International CES 2000 Report—Universal Electronics Inc. (2000) (http://www.remotecentral.com/ces2000/uei.htm).
"Data Formats for IR Remote Controls", Vishay Semiconductors, Document No. 30071, Rev. A2, (Aug. 27, 2003).

(56) References Cited

OTHER PUBLICATIONS

AT2400 AllTouch Remote Control User's Guide, Scientific Atlanta Inc., (2002).
User Interface—Infrared Learner (Remote Control), Application Note AN2092, Cypress Semiconductor, Document No. 001-41063, (Nov. 11, 2002).
VCR CommanderTM Service User's Guide, Scientific-Atlanta Inc. (2000).
Michael Brown, Product Reviews—Logitech Harmony 900 Review, User Review 1 (Sep. 14, 2009) (https://www.digitaltrends.com/gadget-reviews/logitech-harmony-900-review/).
Dave Rees, Logitech Harmony 900 Universal Remote Review, The Gadgeteer, User Review 2 (https://the-gadgeteer.com/2010/01/25/logitech-harmony-900-universal-remotereview/).
Connecting the Explorer 8300HDTM Digital Video Recorder Manual, Scientific Atlantic Inc. (2005).
Patent Owners Preliminary Response in IPR2021-00299.
Nitial Determination in ITC-337-TA-1200.
Commission Decision in ITC-337-TA-1200.
U.S. Appl. No. 61/680,876 to Arling et al. ("'876 Provisional").
Expert Report of Dr. Craig Rosenberg from ITC-337-TA-1200 dated Nov. 19, 2020 (Redacted Relevant Pages—Non Confidential Version).
Patent Owner Infringement Claim Chart of U.S. Pat. No. 10,593,196 marked Ex. 5 in ITC-337-TA-1200 (Redacted Relevant Pages—Non Confidential Version).
Prosecution History of U.S. Pat. No. 10,593,196 to Arling.
Brazilian Patent Office, office action issued on Brazilian patent application No. BR112014010028-4, dated May 17, 2022, 7 pages.
EPO, extended European search report issued of European patent application No. 19871693.8 dated Jun. 14, 2022, 10 pages.
Direct TV TiVo Installation Guide, Hughes Network Systems, 68 pgs.
The Essential Guide to User Interface Design, Second Edition, An Introduction to GUI Design Principles and Techniques, Wilbert O. Galitz, Whiley Computer Publishing, John Wiley & Sons, Inc., 2002, 786 pgs.
ETSI TS 102 006 v1.3.1, (May 2004), Technical Specification, Digital Video Broadcasting (DVB); Specification for System Software Update in DVB Systems, European Broadcasting Union, 39 pgs.
HDMI Specification Version 1.3a, Hitachi, Ltd., et al., Nov. 10, 2006, 2001-2006 by Hitachi, Ltd., et al., 276 pgs.
Norme Internationale International Standard, CEI IEC 61883-1, First edition, Feb. 1998, Consumer audio/video equipment—Digital interface—Part 1:General, Copyright International Electrotechnical Commission, Ref. No. CEI/IEC 61883-1:1998, Order No. W2248667, 100 pgs.
The State Intellectual Property Office of People's Republic of China, Second Office Action issued in Appl. No. 201480057944.0, 14 pgs.
Infrared Data Association Serial Infrared Physical Layer Specification, Version 1.4, May 30, 2001, 1994, Infrared Data Association, 68 pgs.
Logitech Unveils Harmony 680 Remote: Maestro of the Living Room Media Center PC, Logitech NASDAQ:LOGI, 4 pgs.
ISA/US, Written Opinion issued in Appln. No. PCT/US12/62161, dated Jan. 18, 2013, 5 pgs.
ISA/US, Int'l Search Report issued in Appln. No. PCT/US12/62161, dated Jan. 18, 2013, 2 pgs.
ISA/KR, Written Opinion issued in Appln. No. PCT/US12/60390, dated Jul. 18, 2013, 7 pgs.
ISA/KR, Int'l Search Report issued in Appln. No. PCT/US 12/60390, dated Jul. 18, 2013, 4 pgs.
ISA/US, Int'l Search Report issued in Appln. No. PCT/US14/38151, dated Jun. 23, 2014, 2 pgs.
ISA/US, Written Opinion issued in Appln. No. PCT/US14/38151, dated Jun. 23, 2014, 7 pgs.
PocketRemote: Integrating a Universal Remote Control with a Handheld Computer, Angus Huang, Submitted to the Department of Electrical Engineering and Computer Science, Feb. 1, 2002, 2002 Angus Huang, 106 pgs.
Sony, 2001 Home Network Roducts, SVR-2000 Digital Network Recorder, 2001 Sony Electronics Inc., 6 pgs.
Sony, 3-060-082-01 (1), Digital Network Recorder SVR-2000, Setup Guide, 2000 by Sony Corporation, Sunnyvale, CA, 94089, http://www.tivo.com, 68 pgs.
Sony, Digital Network Recorder, Installation Guide, SVR-3000, 2002 by Sony Electronics Inc., 58 pgs.
Personal TV Owner's Guide, TiVo, Philips, 1999 by TiVo, Inc., USA, 153 pgs.
Philips, Directv, TiVo, DIRECTV Receiver with TiVo Viewer's Guide, 154 pgs.
Digital Video Recorder with TiVo, Spring and Fall 2001, Service Update Guide, 65 pgs.
RCA, Tivo Viewer's Guide, 1999, 2000 by TiVo, Inc., 96 pgs.

* cited by examiner

| Function | Appliance | | | | | |
|---|---|---|---|---|---|---|
| | TV | AVR | STB/DVR | DVD | CD | Etc..... |
| Power on | CEC | CEC | CEC | CEC | IR | |
| Power off | CEC | CEC | CEC | CEC | IR | |
| Volume up | IR | CEC | n/a | n/a | n/a | |
| Volume down | IR | CEC | n/a | n/a | n/a | |
| Mute | IR | CEC | n/a | n/a | n/a | |
| Play | n/a | n/a | CEC | CEC | IR | |
| Pause | n/a | n/a | CEC | CEC | IR | |
| FF | n/a | n/a | CEC | CEC | IR | |
| Rew | n/a | n/a | CEC | CEC | IR | |
| Sound field A | CEC | IP | IP | n/a | n/a | |
| Sound field B | CEC | IP | IP | n/a | n/a | |
| Input 1 | CEC | IR | n/a | n/a | n/a | |
| Input 2 | CEC | IR | n/a | n/a | n/a | |
| Etc..... | | | | | | |

Figure 7

SYSTEM AND METHOD FOR OPTIMIZED APPLIANCE CONTROL

RELATED APPLICATION INFORMATION

This application claims the benefit of and is a continuation of U.S. application Ser. No. 16/778,241, filed on Jan. 31, 2020, which application claims the benefit of and is a continuation of U.S. application Ser. No. 16/199,463, filed on Nov. 26, 2018, which application claims the benefit of and is a continuation of U.S. application Ser. No. 15/900, 342, filed on Feb. 20, 2018, which application claims the benefit of and is a continuation of U.S. application Ser. No. 15,789,547, filed on Oct. 20, 2017, which application claims the benefit of and is a continuation of U.S. application Ser. No. 15/259,847, filed on Sep. 8, 2016, which application claims the benefit of and is a continuation of U.S. application Ser. No. 14/136,023, filed on Dec. 20, 2013, which application claims the benefit of and is a continuation-in-part of U.S. application Ser. No. 13/899,671, filed on May 22, 2013, which application claims the benefit of and is a continuation of U.S. application Ser. No. 13/657,176, filed on Oct. 22, 2012, which application claims the benefit of U.S. Provisional Application No. 61/552,857, filed Oct. 28, 2011, and U.S. Provisional Application No. 61/680,876, filed Aug. 8, 2012, the disclosures of which are incorporated herein by reference in their entirety.

This application is also related to U.S. patent application Ser. No. 12/621,277, filed on Nov. 18, 2009 and entitled "System and Method for Reconfiguration of an Entertainment System Controlling Device," which in turn is a continuation-in-part of U.S. patent application Ser. No. 12/569, 121 (now U.S. Pat. No. 8,243,207), filed on Sep. 29, 2009 and entitled "System and Method for Activity Based Configuration of an Entertainment System," the disclosures of which are incorporated herein by reference in their entirety.

This application is also related to U.S. patent application Ser. No. 13/198,072, filed on Aug. 4, 2011 and entitled "System and Method for Configuring the Remote Control Functionality of a Portable Device," the disclosure of which is incorporated herein by reference in its entirety.

This application is also related to U.S. patent application Ser. No. 13/240,604, filed on Sep. 22, 2011 and entitled "System and Method for Configuring Controlling Device Functionality," the disclosure of which is incorporated herein by reference in its entirety.

BACKGROUND

Controlling devices, for example remote controls, for use in issuing commands to entertainment and other appliances, and the features and functionality provided by such controlling devices are well known in the art. In order to facilitate such functionality, various communication protocols, command formats, and interface methods have been implemented by appliance manufacturers to enable operational control of entertainment and other appliances, also as well known in the art. In particular, the recent proliferation of wireless and wired communication and/or digital interconnection methods such as WiFi, Bluetooth, HDMI, etc., amongst and between appliances has resulted in a corresponding proliferation of such communication protocols and command formats. While many of these newer methods may offer improved performance and/or reliability when compared to previous control protocols, appliance manufacturer adoption of such newer methods remains inconsistent and fragmented. This, together with the large installed base of prior generation appliances, may cause confusion, misoperation, or other problems when a user or manufacturer of a controlling device, such as a remote control, attempts to take advantage of the enhanced features and functionalities of these new control methods.

SUMMARY OF THE INVENTION

This invention relates generally to enhanced methods for appliance control via use of a controlling device, such as a remote control, smart phone, tablet computer, etc., and in particular to methods for taking advantage of improved appliance control communication methods and/or command formats in a reliable manner which is largely transparent to a user and/or seamlessly integrated with legacy appliance control technology.

To this end, the instant invention comprises a modular hardware and software solution, hereafter referred to as a Universal Control Engine (UCE), which is adapted to provide device control across a variety of available control methodologies and communication media, such as for example various infrared (IR) remote control protocols; Consumer Electronic Control (CEC) as may be implemented over a wired HDMI connection; internet protocol (IP), wired or wireless; RF4CE wireless; Bluetooth (BT) wireless personal area network(s); UPnP protocol utilizing wired USB connections; or any other available standard or proprietary appliance command methodology. Since each individual control paradigm may have its own strengths and weaknesses, the UCE may be adapted to combine various control methods in order to realize the best control option for each individual command for each individual device.

The UCE itself may be adapted to receive commands from a controlling device, for example, a conventional remote control or a remote control app resident on a smart device such as a phone or tablet, etc., utilizing any convenient protocol and command structure (IR, RF4CE, BT, proprietary RF, etc.) As will become apparent, the controlling device may range from a very simple unidirectional IR device to a fully functional WiFi enabled smart phone or the like. The UCE may receive command requests from such a controlling device and apply the optimum methodology to propagate the command function(s) to each intended target appliance, such as for example a TV, AV receiver, DVD player, etc. In this manner the UCE may enable a single controlling device to command the operation of all appliances in a home theater system while coordinating available methods of controlling each particular appliance in order to select the best and most reliable method for issuing each command to each given device. By way of example without limitation, a UCE may utilize IR commands to power on an AV receiver appliance while CEC commands or another method may be used to select inputs or power down the same AV receiver appliance; or CEC commands may be used to power on and select inputs on a TV appliance while IR commands may be used to control the volume on the same TV appliance.

As will become apparent, a UCE may comprise modular hardware and software which may be embodied in a stand-alone device suitable for use in an existing home theater equipment configuration, or may be incorporated into any one of the appliances such as a STB, TV, AV receiver, HDMI switch etc. Further, when incorporated into an appliance, UCE functionality may be provisioned as a separate hardware module or may be incorporated together with other hardware functionality, e.g., as part of an HDMI interface IC or chip set, etc.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIG. 7 illustrates an exemplary preferred command matrix for use in a UCE-based control environment, for example as illustrated in FIG. 6;

DETAILED DESCRIPTION

Figure 1:
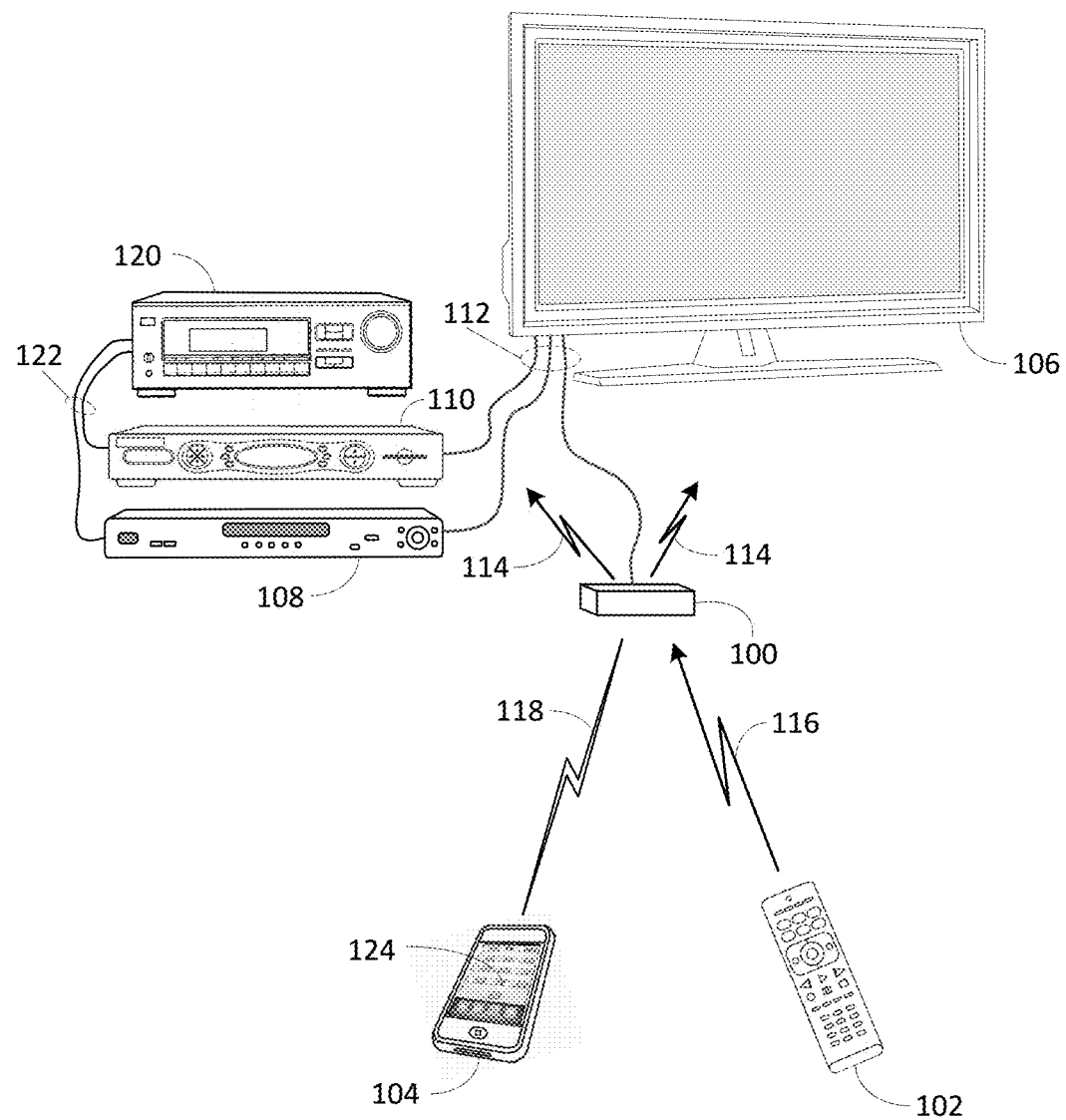
FIGS. 1 and 2 illustrate exemplary systems in which a standalone UEC device may be utilized to command operation of several appliances.

With reference to FIG. 1, there is illustrated an exemplary system in which a UCE device 100 may be used to issue commands to control various controllable appliances, such as a television 106, a cable set top box combined with a digital video recorder ("STB/DVR") 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. In the illustrative example of FIG. 1, appliance commands may be issued by UCE 100 in response to infrared ("IR") request signals 116 received from a remote control device 102, radio frequency ("RF") request signals 118 received from an app 124 resident on a smart device 104, or any other device from which UCE 100 may be adapted to receive requests, using any appropriate communication method. As illustrated, transmission of the requested appliance commands from the UCE to appliances 106,108,112,120 may take the form of wireless IR signals 114 or CEC commands issued over a wired HDMI interface 112, as appropriate to the capabilities of the particular appliance to which each command may be directed. In particular, in the exemplary system illustrated, AV receiver 120 may not support HDMI inputs, being connected to audio source appliances 108,110 via, for example S/PDIF interfaces 122. Accordingly UCE 100 may be constrained to transmit all commands destined for AV receiver 120 exclusively as IR signals, while commands destined for the other appliances 106 through 110 may take the form of either CEC or IR signals as appropriate for each command. By way of example without limitation, certain TV manufacturers may elect not to support volume adjustment via CEC. If the illustrative TV 106 is of such manufacture, UCE 100 may relay volume adjustment requests to TV 106 as IR signals 114, while other requests such as power on/off or input selections may be relayed in the form of CEC commands over HDMI connection 112.

It will however be appreciated that while illustrated in the context of IR, RF, and wired CEC signal transmissions, in general, transmissions to and from UCE device 100 may take the form of any convenient IR, RF, hardwired, point-to-point, or networked protocol, as necessary for a particular embodiment. Further, while wireless communications 116, 118, etc., between exemplary devices are illustrated herein as direct links, it should be appreciated that in some instances such communication may take place via a local area network or personal area network, and as such may involve various intermediary devices such as routers, bridges, access points, etc. Since these items are not necessary for an understanding of the instant invention, they are omitted from this and subsequent Figures for the sake of clarity.

Since smart device remote control apps such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, the before mentioned U.S. patent application Ser. No. 12/406, 601 or U.S. patent application Ser. No. 13/329,940, (now U.S. Pat. No. 8,243,207).

Figure 2:
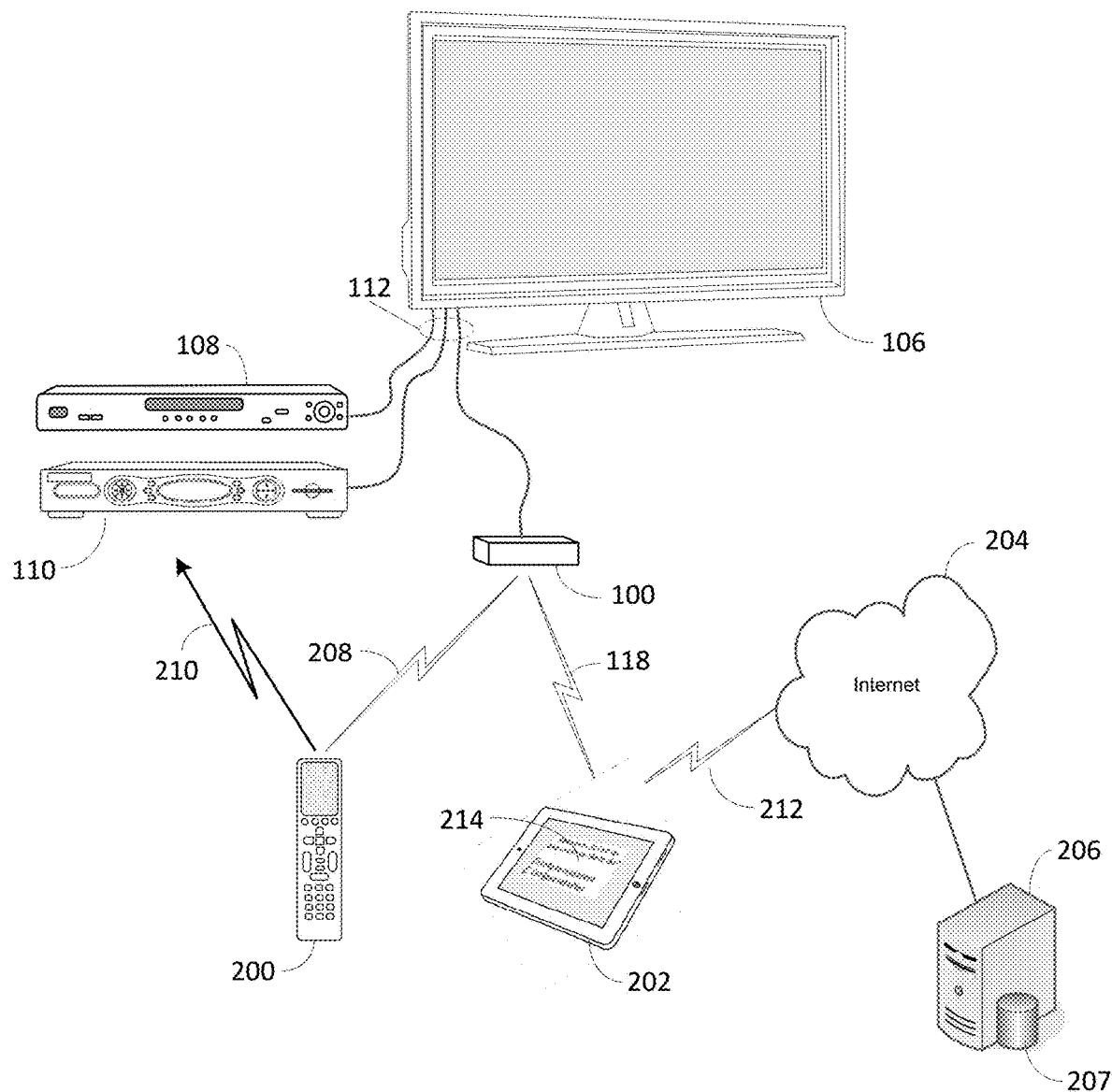

Turning now to FIG. 2, in a further illustrative embodiment, UCE 100 may receive wireless request signals from a remote control 200 and/or an app resident on a tablet computer 202. As before, command transmissions to appliances 106,108,110 may take the form of wired CEC commands or wireless IR commands. However, in this example remote control 200 may be in bi-directional communication 208 with UCE 100 and accordingly the UCE may delegate the transmission of IR commands 210 to the remote control device 200, i.e., use remote control 200 as a relay device for those commands determined to be best executed via IR transmissions. As also generally illustrated in FIG. 2, a setup app 214 executing on a smart device such as tablet computer 202 may be utilized in conjunction with an Internet (212, 204) accessible or cloud based server 206 and associated database 207 to initially configure UCE 100 for operation with the specific group of appliances to be controlled, i.e., to communicate to UCE 100 a matching command code set and capability profile for each particular appliance to be controlled, for example based on type, manufacture, model number, etc., as will be described in greater detail hereafter.

Figure 3:
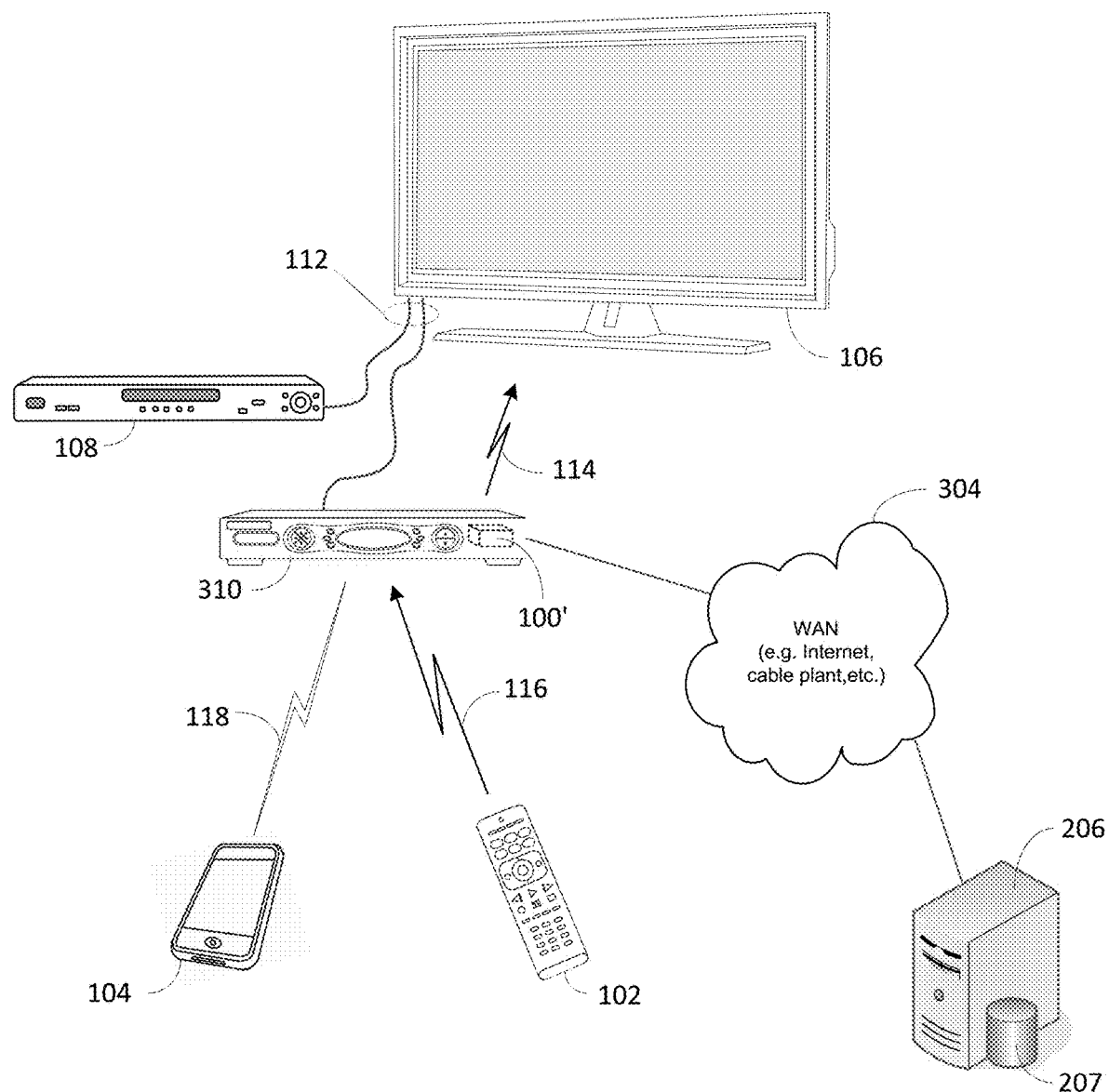
FIGS. 3 and 4 illustrate exemplary systems in which UEC functionality may be incorporated into an appliance which is part of a home entertainment system.

With reference to FIG. 3, in a further illustrative embodiment UCE functionality 100' may be embedded in an appliance, for example STB/DVR 310. In this example, remote control 102 and/or smart device 104 may transmit wireless request signals directly to STB/DVR 310 for action by the built-in UCE function 100', which actions may, as before, comprise CEC command transmissions via HDMI connection 112 or IR command transmissions 114, originating in this instance from an IR blaster provisioned to the STB/DVR appliance 310. In this configuration, a set up application resident in STB/DVR 310 may be utilized to configure UEC 100', using for example an Internet connection 304 accessible through a cable modem and/or cable distribution system headend.

Figure 4:
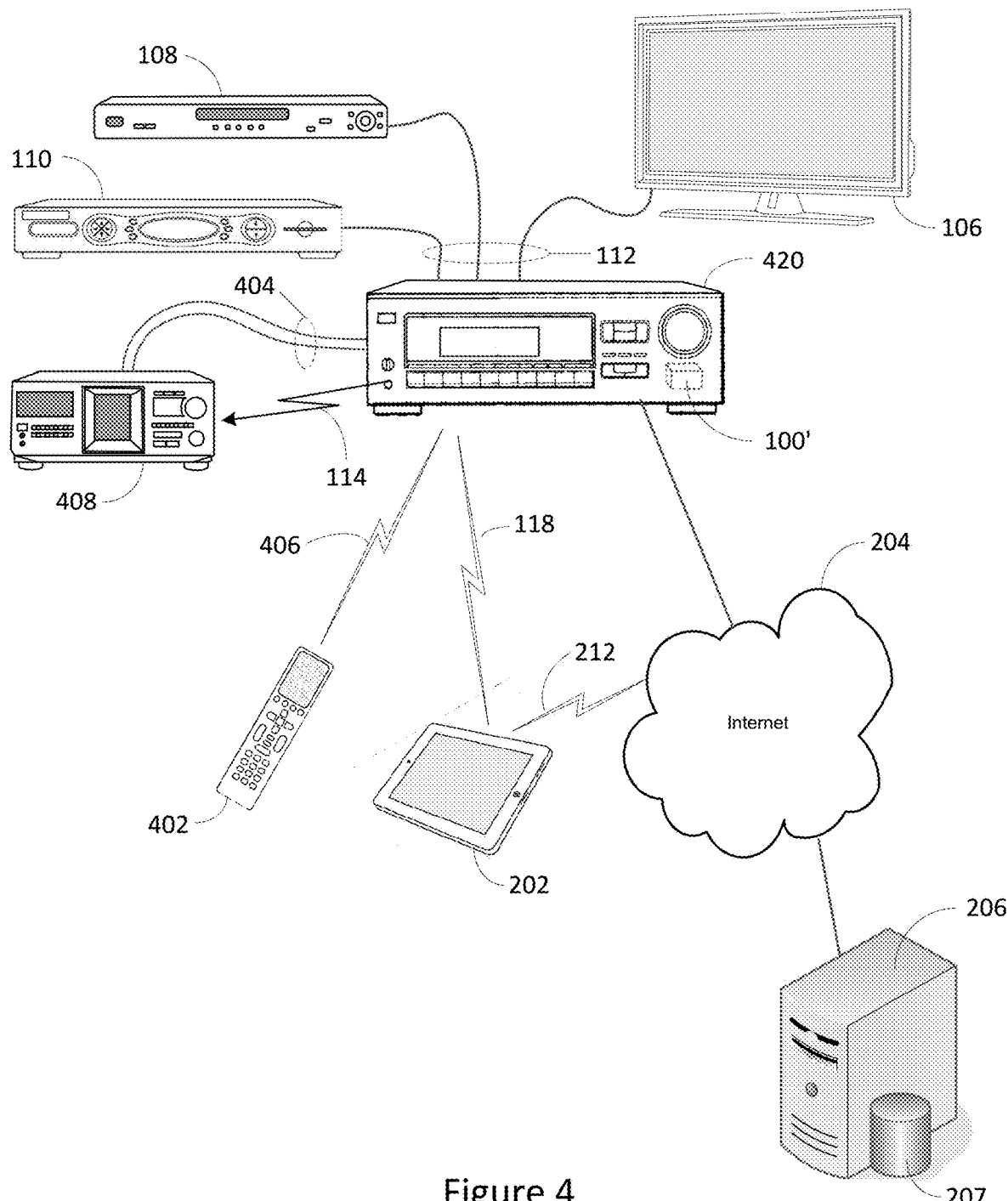

In the further illustrative embodiment of FIG. 4, UCE functionality 100' may be embedded in an AV receiver 420 which may serve as an HDMI switch between various content sources such as a STB/DVR 110 or a DVD player 108 and a rendering device such as TV 106. In addition to HDMI inputs, AV receiver 420 may also support various other input formats, for example analog inputs such as the illustrative 404 from CD player 408; composite or component video; S/PDIF coaxial or fiberoptic; etc. In this embodiment, request signals 406 may be directed to AV receiver 420, for example from remote control 402, for action by UCE function 100'. As before, resulting appliance commands may be transmitted using CEC signals transmitted over HDMI connections 112, or via IR signals 114 transmitted from an associated IR blaster. As appropriate for a particular embodiment, initial configuration of UCE 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying UCE concept, for example UCE function 100' may be incorporated into an Internet-capable TV, an HDMI switch, a game console, etc.; appliance command set and capability database 207 may be located at an internet cloud or a cable system headend, may be stored locally (in all or in part), which local storage may take the form of internal memory within the UCE itself or in an appliance such as a TV, STB or AV receiver, or may take the form of a memory stick or the like attachable to a smart device or appliance; etc.

Figure 5:
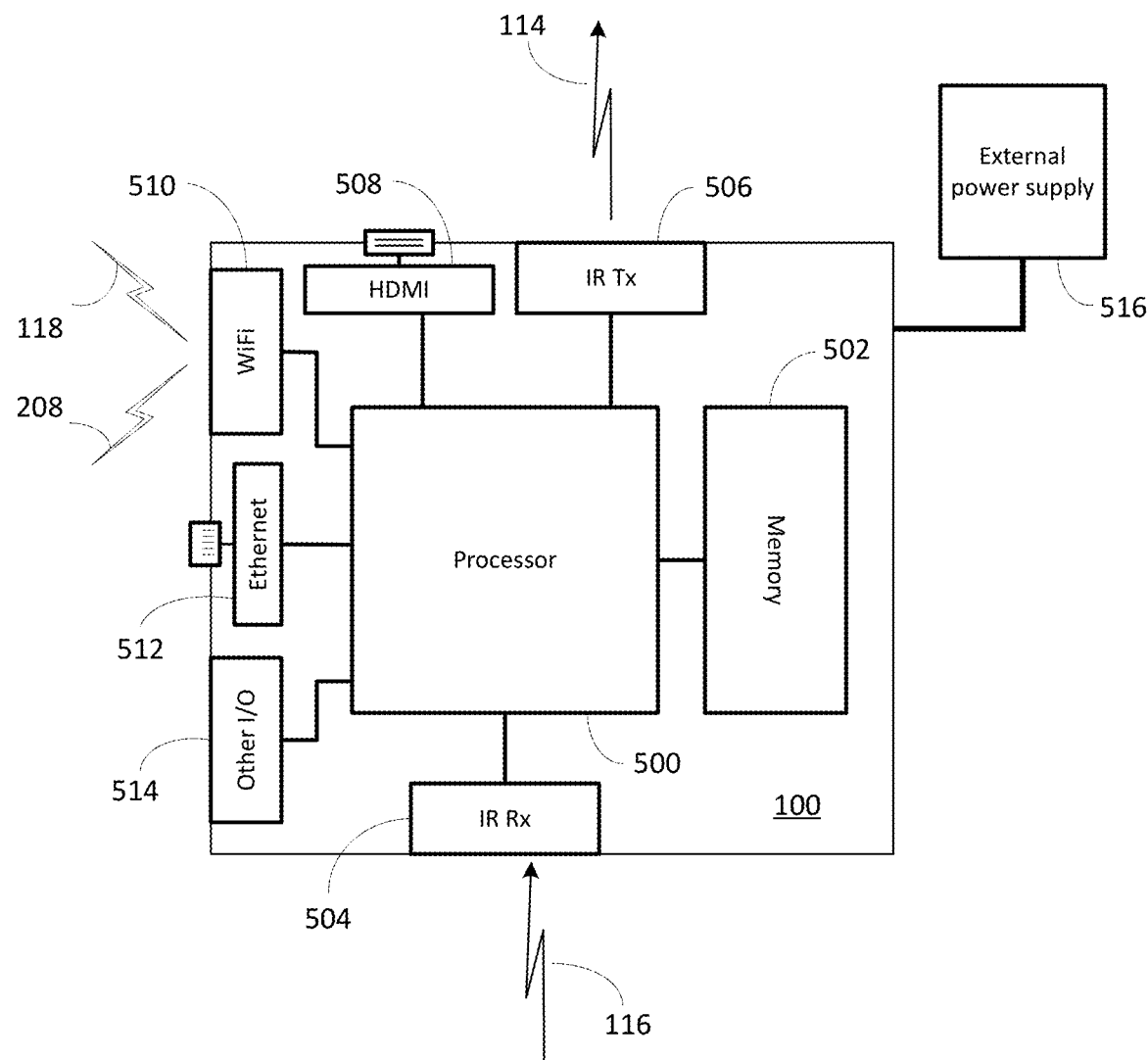
FIG. 5 illustrates a block diagram of an exemplary UEC device.

With reference to FIG. 5, an exemplary UCE device 100 (whether stand alone or in an appliance supporting UCE functionality) may include, as needed for a particular application, a processor 500 coupled to a memory 502 which memory may comprise a combination of ROM memory, RAM memory, and/or non-volatile read/write memory and may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the exemplary UCE platform may include IR receiver circuitry 504 and IR transmitter circuitry 506; an HDMI interface 508; a WiFi transceiver and interface 510; an Ethernet interface 512; and any other wired or wireless I/O interface(s) 514 as appropriate for a particular embodiment, by way of example without limitation Bluetooth, RF4CE, USB, Zigbee, Zensys, X10/Insteon, HomePlug, HomePNA, etc. The electronic components comprising the exemplary UCE device 100 may be powered by an external power source 516. In the case of a standalone UCE device such as illustrated in FIG. 1 or 2, this may comprise for example a compact AC adapter "wall wart," while integrated UCE devices such as illustrated in FIG. 3 or 4 may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

As will be understood by those skilled in the art, some or all of the memory 502 may include executable instructions that are intended to be executed by the processor 500 to control the operation of the UCE device 100 (collectively, the UCE programming) as well as data which serves to define the necessary control protocols and command values for use in transmitting command signals to controllable appliances (collectively, the command data). In this manner, the processor 500 may be programmed to control the various electronic components within the exemplary UCE device 100, e.g., to monitor the communication means 504,510 for incoming request messages from controlling devices, to cause the transmission of appliance command signals, etc. To cause the UCE device 100 to perform an action, the UCE device 100 may be adapted to be responsive to events, such as a received request message from remote control 102 or smart device 104, changes in connected appliance status reported over HDMI interface 508, WiFi interface 510, or Ethernet interface 512, etc. In response to an event, appropriate instructions within the UCE programming may be executed. For example, when a command request is received from a smart phone 104, the UCE device 100 may retrieve from the command data stored in memory 502 a preferred command transmission medium (e.g., IR, CEC over HDMI, IP over WiFi, etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the UCE programming in order to facilitate adjustment of appliance settings to match user-defined activity profiles, e.g. "Watch TV", "View a movie", etc.

Figure 6:
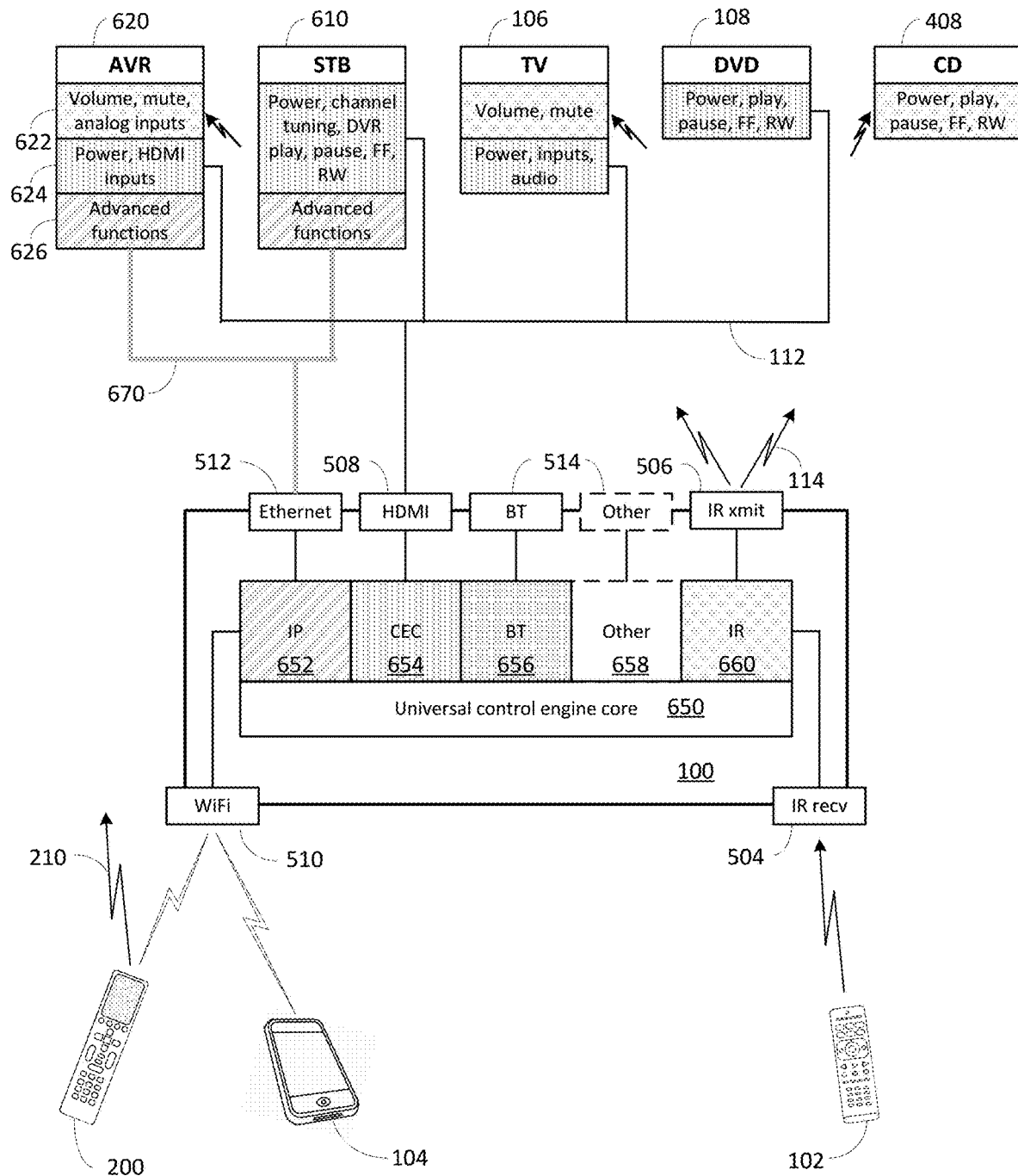
FIG. 6 illustrates a graphical representation of an exemplary UCE-based control environment.

An overview of an exemplary UCE control environment is presented in FIG. 6. The UCE programming of an exemplary UCE device 100 may comprise a universal control engine core 650 together with a series of scalable software modules 652 through 660, each module supporting a particular appliance command protocol or method and provisioned as appropriate for a particular embodiment. By way of example, the illustrative embodiment of FIG. 6 may include an internet protocol (IP) module 652, a CEC over HDMI module 654, a Bluetooth module 656, an IR module 660, and other modules(s) 658, as appropriate for the particular application. The appliances to be controlled may include an IP enabled AV receiver 620, an IP enabled STB/DVR 610, TV 106, DVD player 108, and CD player 408. As illustrated, certain of these devices may be interconnected via HDMI 112 and/or Ethernet 670 interfaces. (In this regard, it should be appreciated that the illustrative interconnections 112 and 670 of FIG. 6 are intended to depict logical topography only, and accordingly details of exact physical cabling structure and/or the presence of any necessary switches, routers, hubs, repeaters, interconnections, etc., are omitted for the sake of clarity.)

The preferred method/protocol/medium for issuance of commands to the exemplary appliances of FIG. 6 may vary by both appliance and by the function to be performed. By way of example, volume control and analog input selection commands 622 targeted to AV receiver 620 may be required to be issued via IR transmissions, while power on/off and HDMI input selection functionality commands 624 may be better communicated via CEC commands and advanced functionality commands 626 such as sound field configuration may be best communicated via an Ethernet connection. In a similar manner, the various operational functions of the other appliances may best commanded via a mixture of mediums, methods, and protocols, as illustrated. As will be appreciated, in some instances a particular appliance may support receipt of an operational command via more than one path, for example the power on/off function of AV receiver 620 may be available not only as a CEC command, but also via an IR command. In such instances, the UCE preferred command format may be that which has been determined to offer the greatest reliability, for example in the above instance the CEC command may be preferred since this form of command is not dependent on line-of-sight and also permits confirmation that the action has been performed by the target appliance.

In order to determine the optimum method for each configured appliance type and command, the exemplary UCE core program 650 may be provisioned with a preferred command matrix 700, as illustrated in FIG. 7. Exemplary preferred command matrix 700 may comprise a series of data cells or elements, e.g. cells 712, each corresponding to a specific command 702 and a specific one of the appliances to be controlled 704. The data content of such a cell or element may comprise identification of a form of command/transmission to be used and a pointer to the required data value and formatting information for the specific command. By way of example, the data element 712 corresponding to the "Input 2" command 706 for the configured TV appliance 708, may comprise an indicator that a CEC command is to be used, i.e., an indicator of the transmission device that is to be used to communicate the command to the intended target appliance, together with a pointer to the appropriate command data value and HDMI-CEC bus address; while data element 714 corresponding to the same command function for the configured AV receiver 710 may comprise an indicator that an IR command is to be used, together with a pointer to appropriate command data and formatting information within an IR code library stored elsewhere in UCE memory 502. In certain embodiments one or more secondary command matrices 716 may also be provisioned, allowing for the use of alternate command methods in the event it is determined by the UCE programming that a preferred command was unsuccessful. Command matrix 700 may also contain null entries, for example 718, where a particular function is not available on or not supported by a specific appliance. In an exemplary embodiment, command matrix 700 may be created and loaded into the memory 502 of UCE 100 during an initialization and set-up process, as will now be described in further detail.

In order to perform initial configuration of a UCE device, a setup application may be provided. In some embodiments, such a set up application may take the form of programming to be executed on any convenient device with a suitable user interface and capable of establishing communication with the UCE, such as without limitation a smart phone, tablet computer, personal computer, set top box, TV, etc., as appropriate for a particular embodiment. In other embodiments such a set up application may be incorporated into the UCE programming itself, utilizing for example a connected TV screen and an associated controlling device as the user interface. Regardless of the exact form and location of the programming and user interface means, the series of steps which may be performed by a UCE set up application when configuring a UCE device for operation with a specific set of appliances remains similar. Accordingly, it will be appreciated that the methods comprising the illustrative UCE set up application presented below in conjunction with FIGS. 8 and 9 may be generally applied, mutatis mutandis, to various alternative set up application embodiments.

Figure 8:
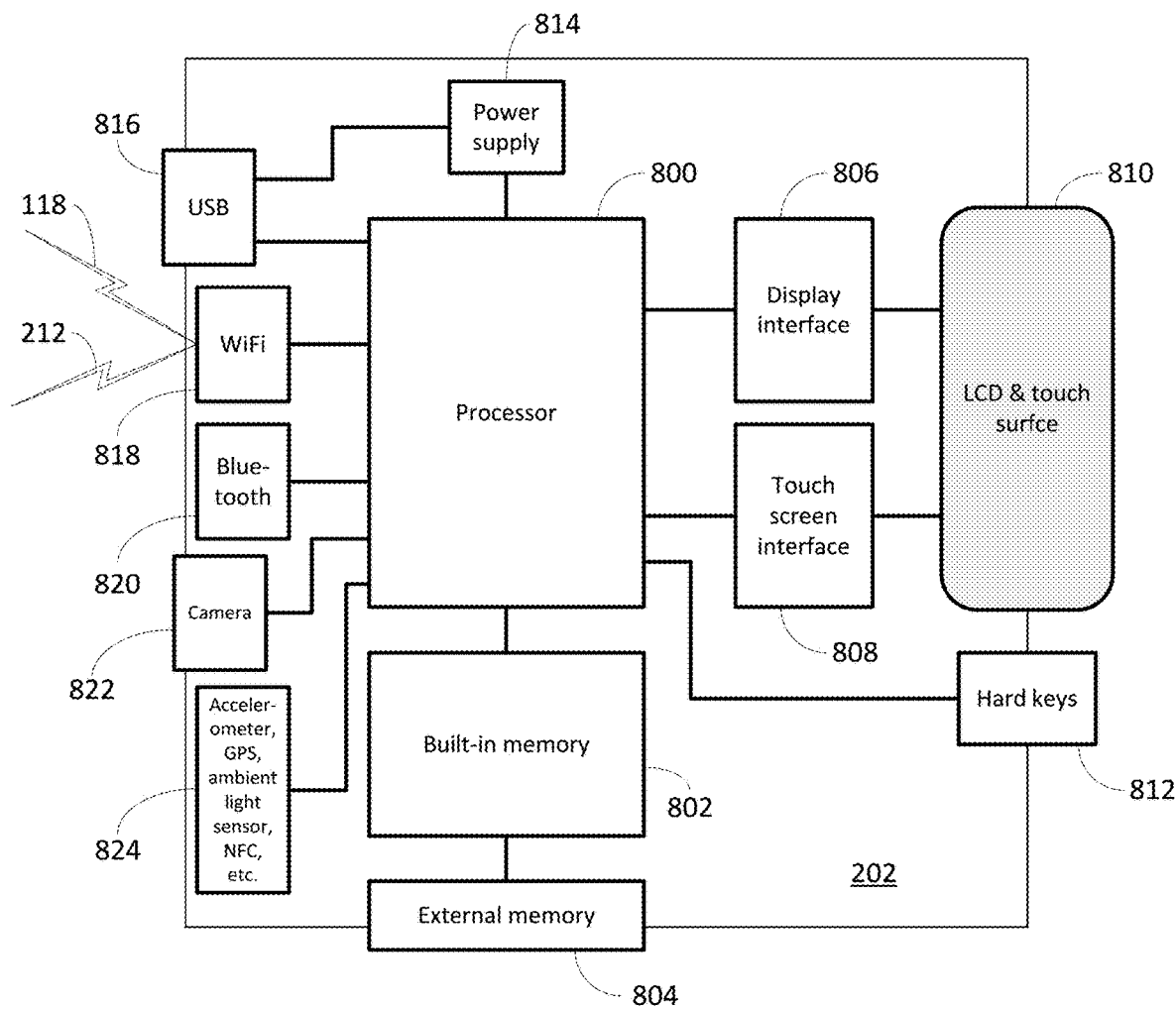
FIG. 8 illustrates a block diagram of an exemplary smart device which may support a remote control app and a setup method for use in configuring a UCE.

With reference to FIG. 8, as known in the art a tablet computer such as the exemplary device 202 of FIG. 2 may comprise, as needed for a particular application, a processor 800 memory 802 which memory may comprise a combination of ROM memory, RAM memory, and/or non-volatile read/write memory and may take the form of a chip, a hard disk, a magnetic disk, an optical disk, a memory stick, etc., or any combination thereof. In some embodiments, provision may also be made for attachment of external memory 804 which may take the form of an SD card, memory stick, or the like. Hardware provisioned as part of an exemplary tablet computer platform may include an LCD touchscreen 810 with associated display driver 806 and touch interface 808; hard keys 812 such as for example a power on/off key; a USB port 816; WiFi transceiver and interface 818; a Bluetooth transceiver and interface 820; a camera 822; and various other features 824 as appropriate for a particular embodiment, for example an accelerometer, GPS, ambient light sensor, near field communicator; etc. The electronic components comprising the exemplary tablet computer device 202 may be powered by a battery-based internal power source 814, rechargeable for example via USB interface 816.

Memory 802 may include executable instructions that are intended to be executed by the processor 800 to control the operation of the tablet computer device 202 and to implement various functionalities such as Web browsing, game playing, video streaming, etc. As is known in the art, programming comprising additional functionalities (referred to as "apps") may be downloaded into tablet computer 202 via, for example, WiFi interface 818, USB 816, external memory 804, or any other convenient method. As discussed previously, one such app may comprise a remote control app, for example as that described in co-pending U.S. patent application Ser. No. 13/329,940 of like assignee and incorporated herein by reference in its entirety, which app may be for use in commanding the operation of appliances 106, 108, 110 and/or 120 via UCE device 100. In order to initially configure UCE device 100 to match the appliances to be controlled and to establish an appropriate command matrix, tablet computer 202 may also be provisioned with a setup app 214, either as part of a remote control app or as separately downloadable item.

Figure 9:
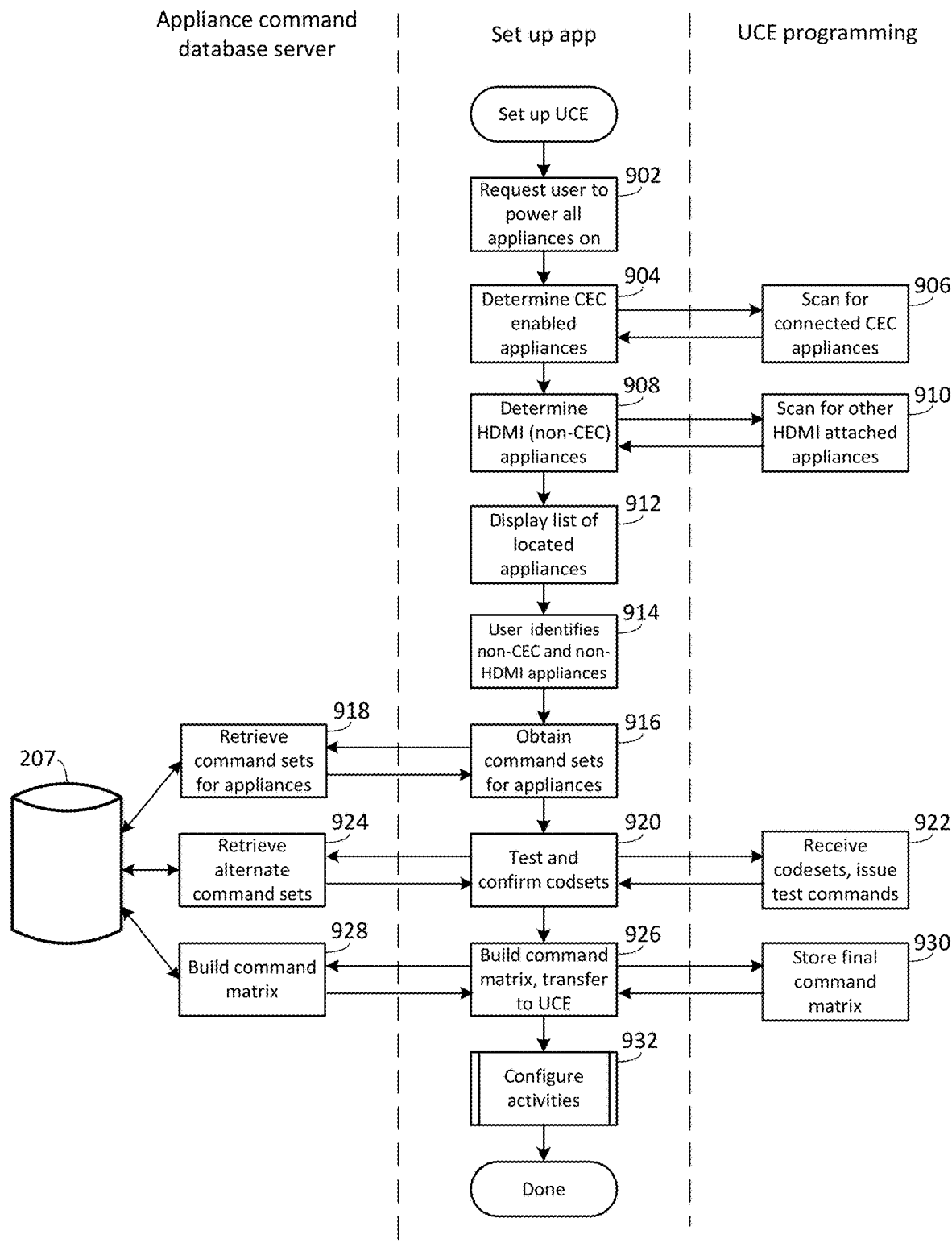
FIG. 9 illustrates an exemplary series of steps which may be performed in order to set up and configure an exemplary UCE.

With reference now to FIG. 9 such a setup app, upon being invoked at step 902 may initially request that the user place all of the appliances to be controlled into a known state, e.g., powered on, in order to enable the appliance detection and/or testing steps which follow. Next, at step 904 the setup app may determine the identity of those appliances which are CEC-enabled. This may be accomplished by communicating a request to the associated UCE, which at step 906 which may cause the UCE programming to scan connected HDMI devices for appliances which are CEC-enabled and/or identifiable via interaction over the HDMI interface, for example as described in co-pending U.S. patent application Ser. No. 13/198,072, of like assignee and incorporated herein by reference in its entirety, and communicate such appliance identities to the setup application. Thereafter, at step 904 the setup application may determine if additional non-CEC appliances are connected to the UCE device via the HDMI interface. This may be accomplished by requesting the UCE programming to scan for any further HDMI connections at step 910 and communicate the findings back to the setup application. Though not illustrated, it will be appreciated that where appropriate for a particular embodiment the UCE programming may conduct similar scans to in order to discover appliances connected via Ethernet, USB, Bluetooth, RF4CE, WiFi etc., where such interfaces may be provisioned to a UCE.

Thereafter, at step 912 the setup application may display a listing of detected appliances (both identified and not yet identified) to the user. At step 914, the user may be prompted to enter appliance identifying information for those HDMI or otherwise connected appliances which were detected but not identified, as well as identifying information regarding any additional appliances which may form part of the system to be controlled but are not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; etc.; or any combination thereof as appropriate for a particular embodiment.

Once appropriate identifying information has been acquired, at step 916 the setup app may communicate that information to a database server, for example server 206, for performance of step 918, comprising identification of and retrieval of command codeset and capability data corresponding to the identified appliances from a database 207, and provision of this data to the setup application for processing and ultimate transfer to the UCE device. As will be appreciated, the transferred codeset data may comprise complete command data values and formatting information, may comprise pointers to command data values and formatting information already stored in the memories 502 and/or 802/804 of the UCE or the device upon which the setup application is currently resident, or a combination thereof. Where necessary, for example when database 207 may contain alternate codesets for an identified appliance, or where uncertainty exists regarding a particular appliance model number, etc., at steps 920, 922, and 924 various control paradigms and/or command data sets may be tested against the appliances to be controlled. Such testing may take the form of soliciting user response to effects observable commands, monitoring of HDMI interface status changes as described for example in U.S. patent application Ser. No. 13/240,604, of like assignee and incorporated herein by reference in its entirety, or any other method as convenient for a particular application. Once appropriate codesets have been fully determined, at steps 926,928 and 930 a suitable preferred command matrix, for example as illustrated in FIG. 7, may be constructed and stored into the memory 502 of exemplary UCE device 100, the matrix being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g. apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said preferred command matrix may be performed at the database server or within the setup application, or a combination thereof, depending on the particular embodiment. Once a preferred command matrix has been finalized and stored in the UCE device, at step 932 a series of desired appliance configurations associated with specific user activities may be configured and stored into the UCE device, as will be now be described.

Figure 10:
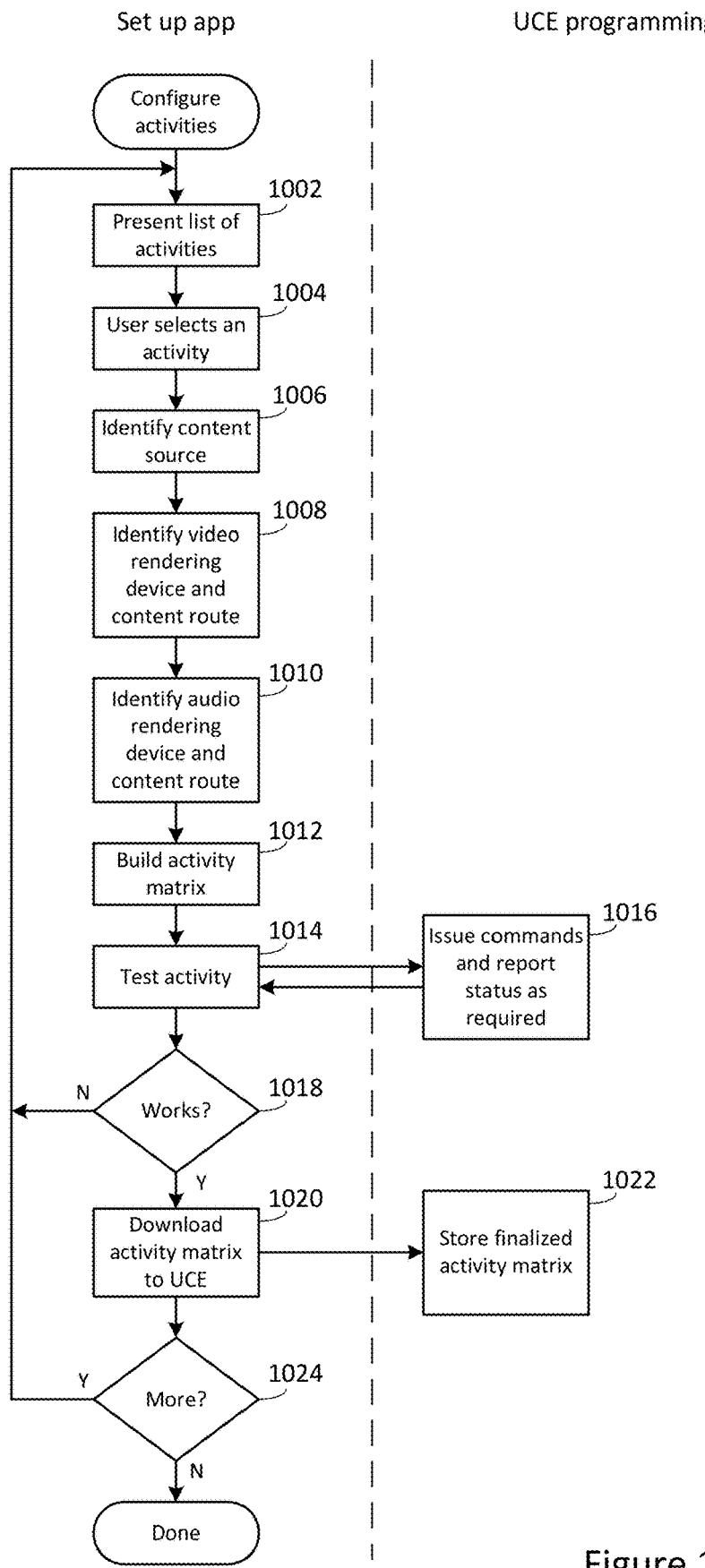
FIG. 10 illustrates an exemplary series of steps which may be performed in order to define to a UCE an appliance configuration which corresponds to a user activity.
Figure 11:
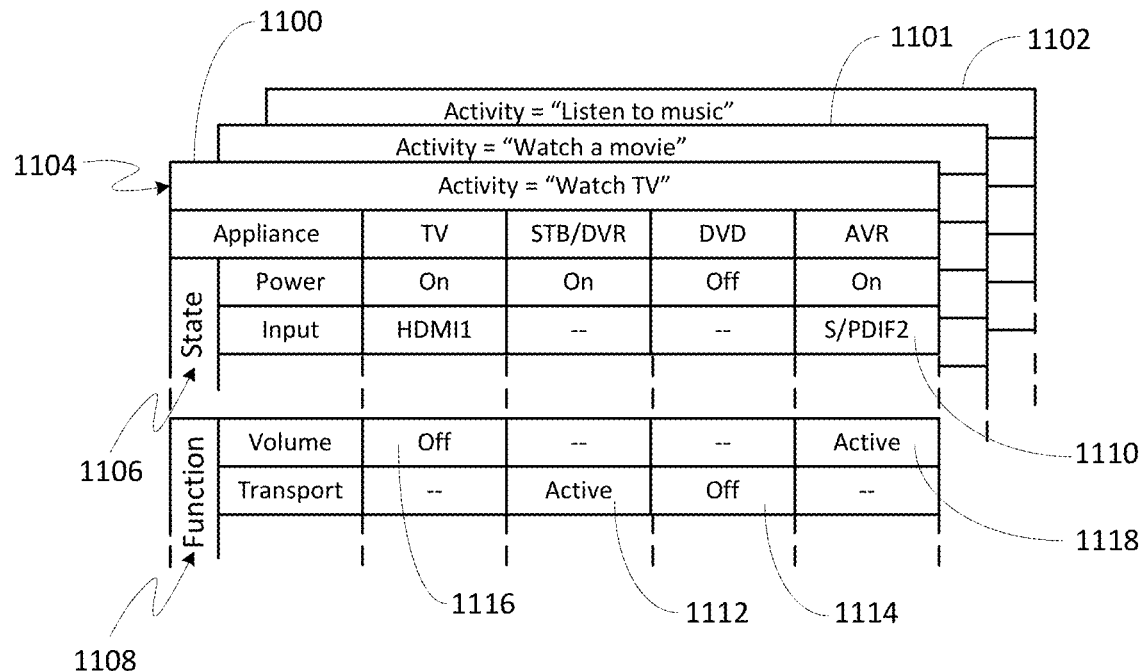
FIG. 11 illustrates exemplary activity configuration matrices such as may be defined during the steps of FIG. 10.

Upon completion and storage of a preferred command matrix, an exemplary setup application may subsequently guide a user through a series of steps in order to establish the desired appliance configurations for a series of possible activities. With reference to FIG. 10, at step 1002, the user may be presented with a list of possible activities, e.g., "Watch TV", "Watch a movie", "Listen to music", etc. In some embodiments, the user may also be able to edit activity titles and/or create additional user defined activities. At step 1004 a user may select a particular activity for configuration, for example "Watch TV". At step 1006, the user may be prompted to identify the content source for the activity being configured, for example cable STB/DVR 110 for the exemplary "Watch TV" activity. Such a prompt may take the form of a listing of eligible appliances as determined during the foregoing appliance set up steps; explicit user entry of an appliance type; etc. Next, at steps 1008 the user may be prompted in a similar manner to select video and audio rendering appliances for use in this activity, for example TV 106 and AVR receiver 120 respectively. Depending upon the system topography and the interfaces in use (i.e. HDMI/CEC, IP, analog, etc.) the set up application in concert with UCE programming may be able to ascertain which input port of each rendering appliance is attached to the content source appliance identified for this activity and/or if any intermediate switching appliance is in use (for example AV receiver 420 of the system illustrated in FIG. 4). Where such information is obtainable, the set up application may automatically create all or part of an appropriate rendering device input selection for the activity being configured. If not, at steps 1008 and 1010, the user may be additionally requested to identify the applicable content route(s) to the rendering appliances, e.g., input port numbers, presence of intermediate switches, etc. During or upon conclusion of steps 1004 through 1010, the set up application may construct an activity matrix, for example as illustrated in FIG. 11. By way of example, activity matrix 1100 for a "Watch TV" activity may comprise a series of cells, for example 1110 or 1112, each corresponding to a desired configuration of a particular state 1106 or function 1108 of a specific appliance 1104 during the specified activity. By way of example, cell 1110 may indicate that the input of AV receiver 120 is to be set to "S/PDIF2", while cells 1112 and 1114 may indicate that transport function commands (e.g., "play", "pause", "fast forward" etc.) are to be directed to STB/DVR 110 and not to DVD 114. In this regard, it will be appreciated that while in some embodiments the assignment of functions such as, for example, volume control, to specific appliances during a particular activity may be performed within an individual controlling device, i.e., the controlling device may determine the appliance to which volume control commands are to be directed, in a preferred embodiment this assignment may be performed within the UCE, thereby ensuring consistency across each activity when multiple controlling devices are present in an environment, for example devices 102 and 104 of the environment illustrated in FIG. 1.

Returning now to FIG. 10, at steps 1014 and 1016 the newly-constructed activity matrix 1100 may be tested by causing the UCE programming, utilizing preferred command matrix 700, to issue the commands necessary to place the identified appliances into the desired state and thereafter receiving verification at step 1018 that the desired activity was successfully initiated. It will be appreciated that such verification may comprise, for example, detection and reporting of HDMI or other content streams and/or appliance status by UCE programming by directly monitoring CEC status or by using methods such as described for example in U.S. patent application Ser. No. 13/240,604; solicitation of user input confirming correct operation; monitoring for presence or absence of analog input signals; recording of appliance status or error messages; etc.; or any combination thereof as appropriate for a particular embodiment.

If testing is unsuccessful, at step 1018 the set up application may return to step 1002 to allow reconfiguration of that activity and/or definition of alternative activities. If testing was successful, at steps 1020 and 1022 the completed activity matrix, for example 1100 as illustrated in FIG. 11, may be transferred to the UCE 100 for storage in UCE memory 502. Thereafter, at step 1024 the user may be offered the opportunity to return to step 1002 to define additional activity configurations, for example 1101,1102 as illustrated in FIG. 11, or to exit the activity configuration process.

Figure 13:
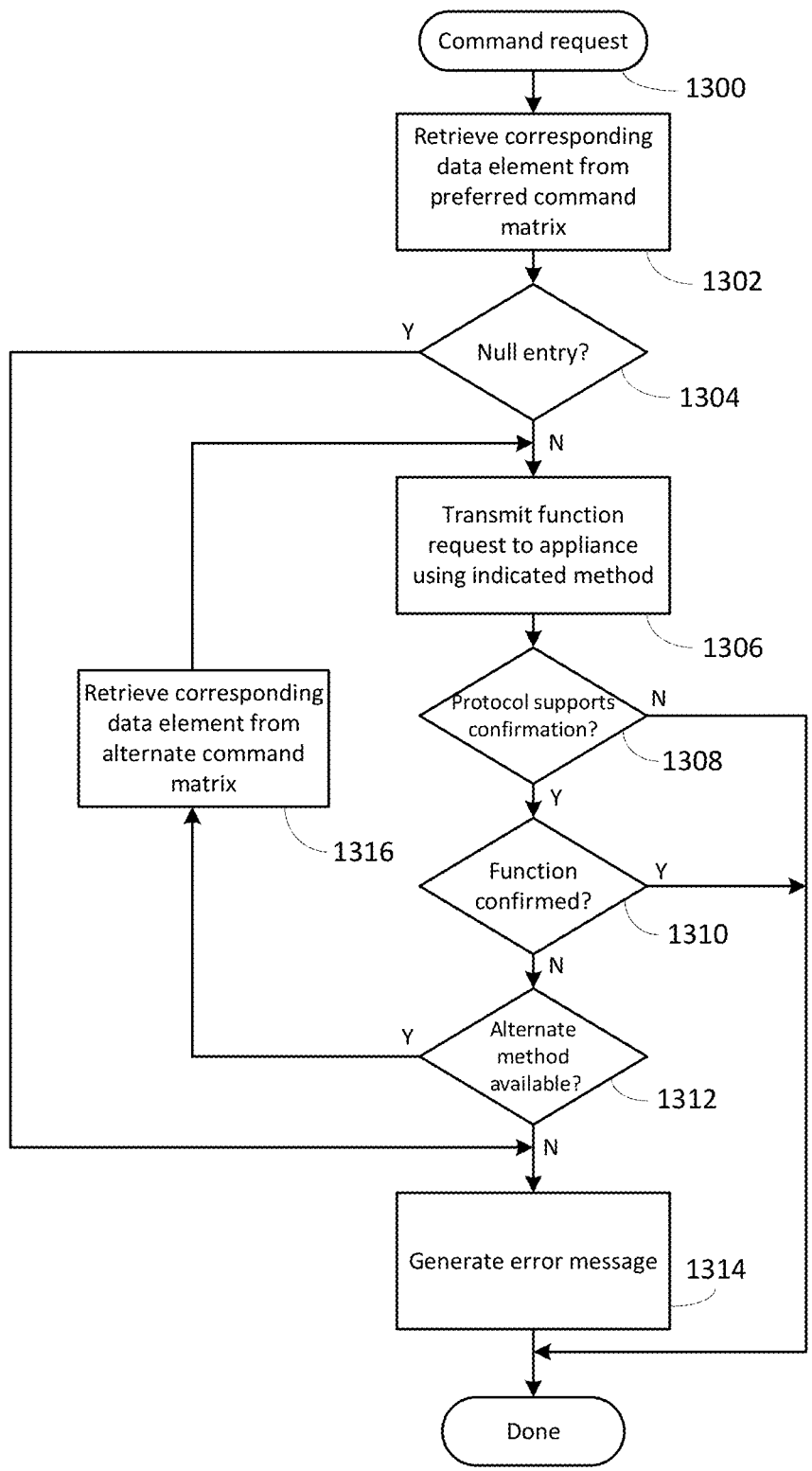
FIG. 13 illustrates an exemplary series of steps which may be performed by a UCE in issuing a function command to an appliance.

With reference now to FIG. 13, the series of steps performed by the UCE programming in order to convey a function command to an appliance in accordance with a command request 1300 received from a controlling device such as remote control 102 or 200, smart device 104 or 202, etc., or in accordance with an internally generated requirement resulting from receipt of an activity request (as will be described hereafter) may initially comprise retrieval from a preferred command matrix that data element which corresponds to the requested command and target appliance. By way of specific example, receipt of a "TV power on" request from remote control 102 or the like at a UEC provisioned with the preferred command matrices illustrated in FIG. 7 may cause retrieval of data element 720, indicating that the command is to be communicated to the TV appliance, e.g., television 106, using an HDMI CEC command. At step 1304, the UCE programming may determine if the retrieved value constitutes a null element. If so, the referenced appliance does not support the requested command and accordingly at step 1314 an error message may be generated and the process thereafter terminated. As will be appreciated, the exact nature of such an error message may depend upon the particular embodiment and/or the requesting controlling device: for example, if the request originated from a controlling device which is in bidirectional communication with the UCE the error may be communicated back to the requesting device for action, i.e., display to the user, illuminate a LED, activate a buzzer, etc. as appropriate. Alternatively, in those embodiments where a UCE is incorporated into an appliance, that appliance's front panel display may be utilized.

If the retrieved preferred command matrix element data is valid, at step 1306 the UCE may communicate the corresponding function command to the target appliance using the indicated command value and transmission method, e.g., for the exemplary data element 720 this may comprise issuing a CEC "power on" command to CEC logical device address zero (TV) via the UCE HDMI interface 508. Once the command has been issued, at step 1308 the UCE programming may determine if the communication interface and protocol used in issuing the command provides for any confirmation mechanism, i.e., explicit acknowledgement of receipt, monitoring of HDMI status on an interface, detection of a media stream or HDCP handshake, etc. If not, for example the command was issued using a unidirectional IR signal and no other confirmation means such as power or input signal monitoring is available, the UCE programming may simply assume that the command was successful and processing is complete. If however confirmation means exists, at step 1310 the UCE programming may wait to determine if the command was successfully executed. Once positive confirmation is received, processing is complete. If no confirmation or a negative confirmation is received, at step 1312 the UCE programming may determine if an alternative method is available to communicate the command to the target appliance. Returning to the specific example presented above this may comprise accessing a secondary command matrix 716 in order to determine if an alternative communication method is available for the specific function, e.g., "TV power on." If an alternative does exist, at step 1316 the substitute command value and transmission method may be retrieved and processing may return to step 1306 to initiate an alternative attempt. Returning again to the specific example, if the CEC "power on" command corresponding to data element 720 of matrix 700 issued to TV 106 cannot be confirmed, an IR "power on" command encoded according to SIRCS (Sony Infrared Control System) in correspondence with the equivalent data element in secondary matrix 716 may be attempted as a substitute.

Figure 12:
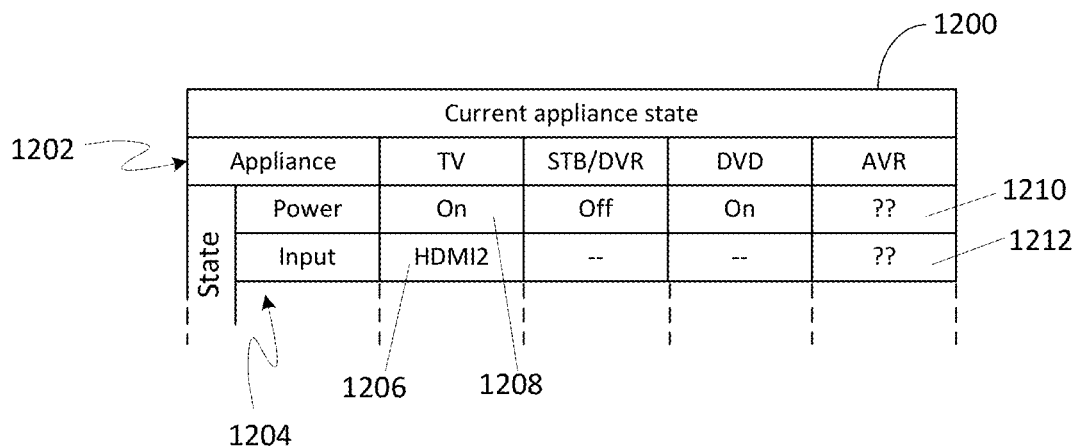
FIG. 12 illustrates an exemplary current appliance state matrix which may be maintained by a UCE for use in determining the commands necessary to invoke one of the states defined by the matrix of FIG. 11.

In addition to relaying individual command requests as described above, an exemplary UCE may also support activity selection, whereby receipt of a single user request from a controlling device may cause a series of commands to be issued to various appliances in order to configure a system appropriately for a particular user activity, such as for example, watching television. To this end a set of matrices defining desired equipment states suitable to various activities, for example as illustrated at 1100 through 1102 of FIG. 11, may be stored in UCE memory 502 for access by UCE programming when executing such a request. As illustrated in FIG. 12, in some embodiments the programming of an exemplary UCE may maintain an additional matrix 1200 representative of the current state of the controlled appliances, arranged for example by appliance 1202 and by operational state 1204. By way of example, data elements 1206 and 1208 in the illustrative table 1200 may indicate that TV 106 is currently powered on (1208) with HDMI port number 2 selected as the input (1206). The data contents of the elements in such a table may be maintained in any convenient manner as appropriate to a particular embodiment, for example without limitation retrieval of HDMI/CEC status; monitoring input media streams and/or HDCP status; measuring power consumption; construction of a simulated appliance state such as described for example in U.S. Pat. No. 6,784,805; etc.; or any combination thereof. In the case of certain appliances, such as for example AV receiver 120 which may be controllable only via unidirectional IR, the current state of the appliance may not be discernible. In such cases, a null data element 1210 maybe entered into exemplary matrix 1200 to indicate that this appliance may require configuration using discrete commands only and/or user interaction. As will be appreciated, in some embodiments the data contents of the illustrative table may be maintained in memory 502 on an ongoing basis by UCE programming, while in other embodiments this data may be gathered "on the fly" at the time the activity request is being processed. Combinations of these methods may also be used, for example "on the fly" gathering for appliances connected via an HDMI bus combined with maintenance of a simulated state for appliances controlled via IR signals.

Figure 14:
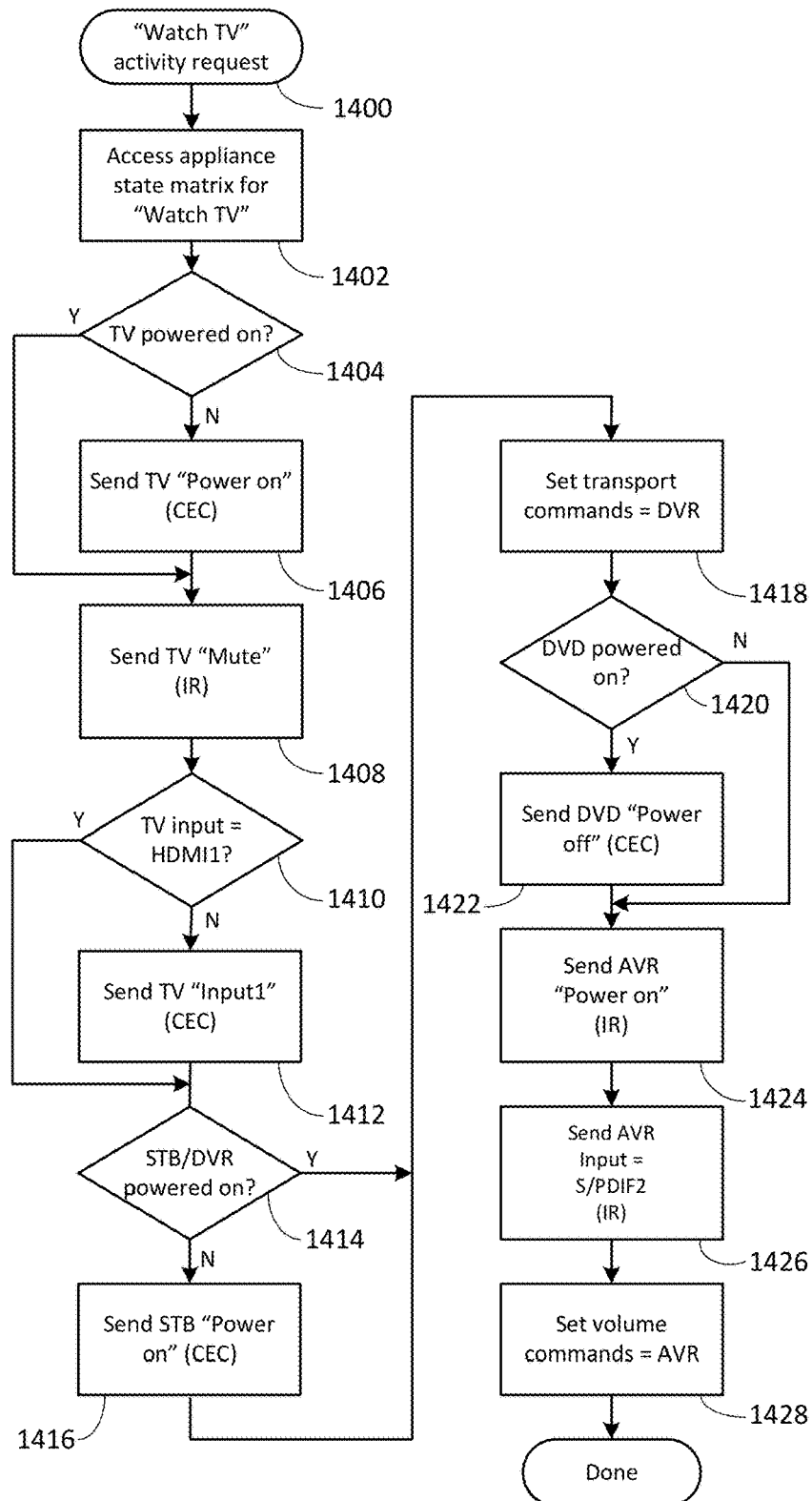
FIG. 14 illustrates an exemplary series of steps which may be performed by a UCE in establishing appliance states matching a desired activity defined in one of the matrices of FIG. 11.

In order to configure a group of appliances for a desired activity, UCE programming may compare a desired state matrix, for example 1100, to a current state matrix, for example 1200, element by element, issuing commands as necessary to bring appliances to the desired state. By way of example, an exemplary series of steps which may be performed by the programming of a UCE in order to effect a "Watch TV" activity configuration will now be presented in conjunction with FIG. 14. For the purposes of this example, the reader may also wish to reference the equipment configuration of FIG. 1 and the activity and current state matrices 1100 and 1200 of FIGS. 11 and 12.

Upon receipt of a "Watch TV" request 1400, at step 1402 the exemplary UCE programming may access an applicable appliance state matrix 1100. Next, at step 1404 it may be determined by the UCE programming whether the present "power" state of TV 106 as indicated by current state matrix 1200 matches the desired state stored in the corresponding data element of matrix 1100. If the states match, processing may continue at step 1408. If the states do not match, at step 1406 a "power on" command may be communicated to TV 106. As will be appreciated from the earlier discussion in conjunction with FIG. 13 and inspection of exemplary preferred command matrix 700, in the illustrative system communication of the "power on" command to TV 106 may comprise a CEC command issued over HDMI connection 112. Next, at step 1408 a "mute" command may be communicated to TV 106, since element 1116 of illustrative matrix 1100 indicates that TV 106 is not the primary audio rendering appliance. In accordance with preferred command matrix 700, communication of the "mute" command to TV 106 may comprise an IR transmission 114. Thereafter, at steps 1410,1412 the active input of TV 106 may be set to "HDMI1" via a CEC command, and at steps 1414,1416 a CEC "power on" command may be communicated to STB/DVR 110 if that appliance is not already powered on. At step 1418, the exemplary UCE programming may set an internal status to indicate that future transport command requests (e.g., play, pause, FF, etc.) should be routed to STB/DVR 110, as indicated by element 1112 of matrix 1100. Thereafter, at steps 1420,1422 a CEC "power off" command may be communicated to STB/DVR 108 if that appliance is not already powered off. Thereafter, at steps 1424 and 1426 "power on" and "input S/PDIF2" commands may be communicated to AV receiver 120 via IR signals. As will be appreciated, it may not be possible to determine the current status of AV receiver 120, as indicated for example by elements 1210 and 1220 of matrix 1200, and accordingly so-called "discrete," or explicit, function commands may be issued which may establish the desired status regardless of the current state of the appliance. Finally, at step 1428 the exemplary UCE programming may set an internal status to indicate that future volume control command requests (e.g. volume up/down, mute) should be routed to AV receiver 120, as indicated by element 1118 of matrix 1100, where after processing of the activity request is complete.

Figure 15:
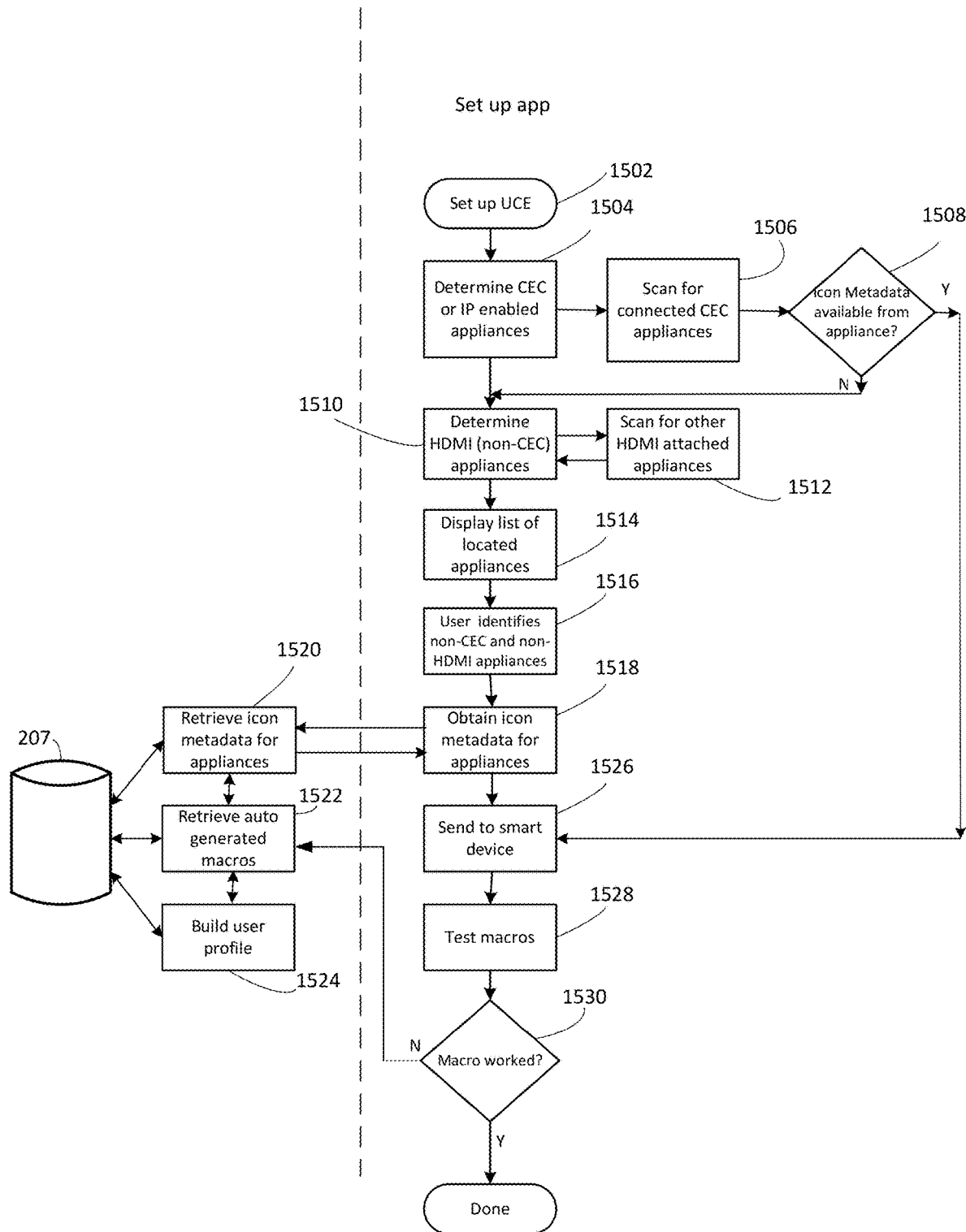
FIG. 15 illustrates an exemplary series of steps which may be performed by a smart device to setup command control macros.

As noted above, the exemplary UCE may also support activity selection, whereby receipt of a single user request from a smart device may cause a series of commands to be issued to various appliances in order to configure a system appropriately for one or more user activities, such as "watch TV," "watch movie," "listen to music," etc. To setup the user interface of the smart device to support such macro command functionality, an exemplary method is illustrated in FIG. 15. More particularly, with reference to FIG. 15, upon invocation of a setup app at step 1502 a user may be requested to place all of the appliances to be controlled into a known state, e.g., powered on or already joined in a wireless network, in order to enable the appliance detection and/or testing steps which follow. Next, at step 1504 the setup app may determine the identity of those appliances which are CEC-enabled or IP enabled. This may be accomplished by communicating a request to the associated UCE, which at step 1506 may cause the UCE programming to scan connected HDMI devices for appliances which are CEC-enabled and/or identifiable via interaction over the HDMI interface, for example as described in co-pending U.S. patent application Ser. No. 13/198,072, of like assignee and incorporated herein by reference in its entirety, and communicate such appliance identities to the setup application. Next, at step 1508 the setup app may also determine if the appliances has any associated icon information (for example stored as metadata on the appliance, available from a remote server, or the like) as well as information related to interface connection types, e.g., WI-FI, HDMI input/output, for use in the creation of supported macros. If the icon information is available, the icon information may be sent to the smart device by the appliance and/or retrieved by the smart device using other information provided by the appliance as appropriate as shown in step 1526. An icon corresponding to the icon information may then be automatically added to the user interface of the smart device whereupon an activation of the added icon may be used to provide access to command and control functionalities associated with the corresponding controllable device, including commands in the form of a listing of automatically generated macros available for that controllable device as described below. Thus, icon information provided to the smart device may be used in connection with information stored on the smart device, stored in the internet cloud and/or at a remote server to automatically add an icon to the user interface of the smart device where the icon can be in the form of a logo for the controllable appliance, icons in the form of logos for content (e.g., television station logos) that can be accessed via the controllable appliance, etc. In a further illustrative embodiment, icons may function as soft keys which may be selected to cause the performance of a further action for example, to display a device control page (e.g., to present television control soft keys such as channel up, channel down, etc.), cause the transmission of commands, etc. as described for example in U.S. patent application Ser. No. 10/288,727, (now U.S. Pat. No. 7,831,930) of like assignee and incorporated herein by reference in its entirety, or any other method as convenient for a particular application.

The setup application then continues to step 1510 (after scanning for CEC connected appliances as discussed above) whereat the setup application may next determine if additional non-CEC appliances are connected to the UCE device via the HDMI interface. This may be accomplished by requesting the UCE programming to scan for any further HDMI connections at step 1512 and communicate the findings back to the setup application. Though not illustrated, it will be appreciated that, where appropriate for a particular embodiment, the UCE programming may conduct similar scans in order to discover appliances connected via Ethernet, USB, Bluetooth, RF4CE, WiFi etc., where such interfaces may be provisioned to a UCE.

Thereafter, at step 1514 the setup application may display a listing of detected appliances (both identified and not yet identified) to the user. At step 1516, the user may then be prompted to enter appliance identifying information for those HDMI or otherwise connected appliances which were detected but not identified, as well as identifying information regarding any additional appliances which may form part of the system to be controlled but which were not discoverable as described above (for example appliances such as AV receiver 120 or CD player 408 which may be responsive only to unidirectional IR commands). Without limitation, such identifying information may take the form of user-entered data such as an appliance type, brand and model number, or a setup code from a listing in a user guide; or may take the form of scanned or electronic information such as a digital picture of the appliance itself or of a bar code, QR code, or the like associated with appliance; near field acquisition of RFID tag data; MAC address; etc.; or any combination thereof as appropriate for a particular embodiment.

Once appropriate identifying information has been acquired, at step 1518 the setup app may communicate that information to a database server, for example server 206, for performance of step 1520 in which the database server uses the identification information to retrieve icon information as needed (e.g., when such data was not obtainable from the appliance), command information as discussed previously, and in step 1522, to automatically generate macros which correspond to the appliance or a plurality of appliances considering their capability data as maintained in a database 207 and/or as retrieved from the appliances. Any such data gathered from and/or created by the server 206 will then be provisioned to the setup application for processing and ultimate transfer to the smart device and/or UCE as required. As will be appreciated, the transferred information and/or metadata may comprise complete command data values, appliance input/output data and current status, formatting information, pointers to command data values and formatting information already stored in the memories 502 and/or 802/804 of the UCE or the device upon which the setup application is currently resident, etc. Where necessary, for example when database 207 may contain alternate codesets, icon metadata, or macro information for an identified appliance, or where uncertainty exists regarding a particular appliance model number, etc., at steps 1528, 1530, and 1522 various control paradigms and/or command data sets may be tested against the appliances to be controlled. Such testing may take the form of soliciting user response to effects observable commands, monitoring of HDMI interface status changes as described for example in U.S. patent application Ser. No. 13/240,604, of like assignee and incorporated herein by reference in its entirety, or any other method as convenient for a particular application. Once appropriate codesets and macro operations have been fully determined, at steps 1528 and 1530 a suitable preferred user profile 1524, may be constructed and stored into the memory 502 of exemplary UCE device 100, the user profile 1524 being constructed by considering the communication capabilities and functionalities of the devices identified via the above-described processes.

In order to select the optimum command method for each function of each configured appliance any suitable method may be utilized, for example a system-wide prioritization of command media and methods by desirability (e.g. apply IP, CEC, IR in descending order); appliance-specific command maps by brand and/or model; function-specific preference and/or priority maps (e.g. all volume function commands via IR where available); etc.; or any combination thereof. The exact selection of command method priorities or mapping may take into account factors such connection reliability, e.g. wired versus wireless, bidirectional versus unidirectional communication, etc.; speed of command transmission or execution; internal priorities within an appliance, e.g. received IP received packets processed before CEC packets, etc.; type of protocol support (e.g. error correction versus error detection; ack/nak, etc.); or any other factors which may applied in order to achieve optimum performance of a particular embodiment.

As will be appreciated, the construction of said user profile 1524 may be performed at the database server or within the setup application, or a combination thereof, depending on the particular embodiment.

While various concepts have been described in detail, it will be appreciated by those skilled in the art that various modifications and alternatives to those concepts could be developed in light of the overall teachings of the disclosure. For example, in an alternate embodiment of UCE functionality, in place of a preferred command matrix such as illustrated in FIG. 7, the programming of an exemplary UCE may utilize a command prioritization list, for example a prioritization list "IP, CEC, IR" may cause the UCE programming to first determine if the requested command can be issued using Internet Protocol, only if not, then determine if the requested command can be issued using a CEC command over the HDMI interface, and only if not, then attempt to issue the requested command via an infrared signal. Such a prioritization reflects an exemplary preference of using bi-directional communication protocols over uni-directional communication protocols over line of sight communication protocols, e.g., IR, when supported by the intended target appliance.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A multimedia receiver, comprising:
a processor;
a plurality of ports;
a memory storing instructions which, when executed by the processor, cause the multimedia device to respond to being placed into a system configuration mode by:
identifying a one of the plurality of ports to which a source media device is connected;
monitoring the identified one of the plurality of ports for a video frame output by the source media device to determine whether the source media device received a test command transmitted to control the source media device using a communication protocol; and
in response to determining that the source media device received the test command, storing an indication that the source media device can be controlled using the communication protocol.

2. The multimedia receiver of claim 1, wherein the multimedia receiver further comprises a receiver configured to receive a request to perform an action executable on the source media device and wherein the instructions, when executed by the processing device, cause the multimedia receiver to transmit an operation command corresponding to the request using the communication protocol based at least on the stored indication.

3. The multimedia receiver of claim 1, wherein the multimedia receiver is configured to transmit the test command to control the source media device in the system configuration mode.

4. The multimedia receiver of claim 3, wherein the communication protocol includes at least one of: an infrared (IR) protocol; a radio-frequency (RF) protocol; an Internet Protocol (IP); or a High-Definition Multimedia Interface (HDMI-CEC) protocol.

5. The multimedia receiver of claim 1, wherein the communication protocol includes at least one of: an infrared (IR) protocol; a radio-frequency (RF) protocol; an Internet Protocol (IP); or a High-Definition Multimedia Interface (HDMI-CEC) protocol.

6. The multimedia receiver of claim 1, wherein the instructions, when executed by the processing device, cause the multimedia receiver to transmit a plurality of test commands to control the source media device, each test command being transmitted using a different communication protocol and, for each of the plurality of test commands: determine whether the source media device received the test command; and in response to determining that the source media device received the test command, store an indication that the source media device can be controlled using the communication protocol corresponding to the test command.

7. A method of testing communication with a device, the method comprising:
placing a multimedia receiver into a system configuration mode; and
transmitting a test command to control a source media device using a communication protocol;
wherein, in the system configuration mode, the multimedia receiver is configured to:
identify a one of a plurality of ports of the multimedia receiver to which the source media device is connected;
monitor the identified one of the plurality of ports for a video frame output by the source media device to determine whether the source media device received the test command; and
in response to determining that the source media device received the test command, store an indication that the source media device can be controlled using the communication protocol.

8. The method of claim 7, further comprising: receiving by the multimedia receiver a request to perform an action executable on the source media device; and transmitting an operation command corresponding to the request using the communication protocol based at least on the stored indication.

9. The method of claim 7, wherein transmitting the test command to the source media device is performed by the multimedia receiver in the system configuration mode.

10. The method of claim 9, wherein the communication protocol includes at least one of: an infrared (IR) protocol; a radio-frequency (RF) protocol; an Internet Protocol (IP); or a High-Definition Multimedia Interface (HDMI-CEC) protocol.

11. The method of claim 7, wherein the communication protocol includes at least one of: an infrared (IR) protocol; a radio-frequency (RF) protocol; an Internet Protocol (IP); or a High-Definition Multimedia Interface (HDMI-CEC) protocol.

12. The method of claim 7, further comprising: transmitting a plurality of test commands to control the source media device, each test command being transmitted using a different communication protocol; for each of the plurality of test commands: determining by the multimedia receiver whether the source media device received the test command; and in response to determining that the source multimedia device received the test command, storing by the media receiver an indication that the source media device can be controlled using the communication protocol corresponding to the test command.

13. The multimedia receiver as recited in claim 1, wherein the multimedia receiver comprises a television.

14. The method as recited in claim 7, wherein the multimedia receiver comprises a television.

* * * * *